(12) United States Patent
Jones

(10) Patent No.: US 7,712,673 B2
(45) Date of Patent: May 11, 2010

(54) IDENTIFICATION DOCUMENT WITH THREE DIMENSIONAL IMAGE OF BEARER

(75) Inventor: Robert L. Jones, Andover, MA (US)

(73) Assignee: L-1 Secure Credentialing, INc., Billerica, MA (US)

( * ) Notice: Subject to any disclaimer, the term of this patent is extended or adjusted under 35 U.S.C. 154(b) by 538 days.

(21) Appl. No.: 10/954,966

(22) Filed: Sep. 29, 2004

(65) Prior Publication Data

US 2005/0109850 A1   May 26, 2005

Related U.S. Application Data

(63) Continuation-in-part of application No. 10/325,434, filed on Dec. 18, 2002, now Pat. No. 6,817,530.

(60) Provisional application No. 60/507,582, filed on Sep. 30, 2003.

(51) Int. Cl.
*G06K 19/06* (2006.01)

(52) U.S. Cl. ............... 235/492; 235/487; 235/380

(58) Field of Classification Search ............ 235/492, 235/487, 380; 283/74
See application file for complete search history.

(56) References Cited

U.S. PATENT DOCUMENTS

| | | |
|---|---|---|
| 2,815,310 A | 12/1957 | Anderson |
| 3,413,171 A | 11/1968 | Hannon |
| 3,496,263 A | 2/1970 | Nakayama et al. |
| 3,569,619 A | 3/1971 | Simjian |
| 3,582,439 A | 6/1971 | Thomas |
| 3,614,839 A | 10/1971 | Thomas |
| 3,665,162 A | 5/1972 | Yamamoto et al. |
| 3,703,628 A | 11/1972 | Philipson, Jr. |
| 3,758,970 A | 9/1973 | Annenberg |
| 3,805,238 A | 4/1974 | Rothfjell |

(Continued)

FOREIGN PATENT DOCUMENTS

CA    2235002    12/1998

(Continued)

OTHER PUBLICATIONS

U.S. Appl. No. 60/000,442, filed Jun. 20, 1995, Hudetz.

(Continued)

*Primary Examiner*—Allyson N Trail
(74) *Attorney, Agent, or Firm*—Mintz Levin Cohn Ferris Glovsky and Popeo, PC

(57) ABSTRACT

An identification document includes a lens system and a specially prepared photo of a document bearer. The lens system and the specially prepared photo cooperate to create a three dimensional photo effect. The document includes two or more document layers. There is a lens structure in one of the document layers, and it includes lens elements. A photo is printed on one or more of the document layers. The photo depicts the document bearer, and includes two or more separate images of the bearer from different perspectives. Parts of the separate images are interleaved together into sets, and the sets are positioned relative to corresponding lens elements of the lens structure. These sets include parts of the separate images such that when viewed through the lens structure, the parts are viewed simultaneously making the subject appear three-dimensional to a viewer.

14 Claims, 21 Drawing Sheets

U.S. PATENT DOCUMENTS

| | | |
|---|---|---|
| 3,838,444 A | 9/1974 | Loughlin et al. |
| 3,845,391 A | 10/1974 | Crosby |
| 3,914,877 A | 10/1975 | Hines |
| 3,922,074 A | 11/1975 | Ikegami et al. |
| 3,984,624 A | 10/1976 | Waggener |
| 4,096,015 A | 6/1978 | Kawamata et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,304,809 A | 12/1981 | Moraw et al. |
| 4,313,197 A | 1/1982 | Maxemchuk |
| 4,313,984 A | 2/1982 | Moraw et al. |
| 4,324,421 A | 4/1982 | Moraw et al. |
| 4,356,052 A | 10/1982 | Moraw et al. |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,423,415 A | 12/1983 | Goldman |
| 4,425,642 A | 1/1984 | Moses et al. |
| 4,476,468 A | 10/1984 | Goldman |
| 4,506,148 A | 3/1985 | Berthold et al. |
| 4,528,588 A | 7/1985 | Lofberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,621,271 A | 11/1986 | Brownstein |
| 4,637,051 A | 1/1987 | Clark |
| 4,653,775 A | 3/1987 | Raphael et al. |
| 4,653,862 A | 3/1987 | Morozumi |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Causse D'Agraives et al. |
| 4,682,794 A | 7/1987 | Margolin |
| 4,689,477 A | 8/1987 | Goldman |
| 4,703,476 A | 10/1987 | Howard |
| 4,711,690 A | 12/1987 | Haghiri-Tehrani |
| 4,712,103 A | 12/1987 | Gotanda |
| 4,718,106 A | 1/1988 | Weinblatt |
| 4,738,949 A | 4/1988 | Sethi et al. |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,790,703 A | 12/1988 | Wing |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,869,946 A | 9/1989 | Clay |
| 4,876,617 A | 10/1989 | Best et al. |
| 4,879,747 A | 11/1989 | Leighton et al. |
| 4,884,139 A | 11/1989 | Pommier |
| 4,888,798 A | 12/1989 | Earnest |
| 4,889,749 A | 12/1989 | Ohashi et al. |
| 4,903,301 A | 2/1990 | Kondo et al. |
| 4,908,836 A | 3/1990 | Rushforth et al. |
| 4,908,873 A | 3/1990 | Philibert et al. |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,968,063 A | 11/1990 | McConville et al. |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka et al. |
| 4,996,530 A | 2/1991 | Hilton |
| 5,010,405 A | 4/1991 | Schreiber et al. |
| 5,023,907 A | 6/1991 | Johnson et al. |
| 5,024,989 A | 6/1991 | Chiang et al. |
| 5,027,401 A | 6/1991 | Soltesz |
| 5,036,513 A | 7/1991 | Greenblatt |
| 5,053,956 A | 10/1991 | Donald et al. |
| 5,060,981 A | 10/1991 | Fossum et al. |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,095,196 A | 3/1992 | Miyata |
| 5,103,459 A | 4/1992 | Gilhousen et al. |
| 5,113,445 A | 5/1992 | Wang |
| 5,113,518 A | 5/1992 | Durst, Jr. et al. |
| 5,128,779 A | 7/1992 | Mallik |
| 5,138,712 A | 8/1992 | Corbin |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,169,707 A | 12/1992 | Faykish et al. |
| 5,171,625 A | 12/1992 | Newton |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,216,543 A | 6/1993 | Calhoun |
| 5,228,056 A | 7/1993 | Schilling |
| 5,237,164 A | 8/1993 | Takada |
| 5,243,423 A | 9/1993 | DeJean et al. |
| 5,245,329 A | 9/1993 | Gokcebay |
| 5,253,078 A | 10/1993 | Balkanski et al. |
| 5,258,998 A | 11/1993 | Koide |
| 5,259,025 A | 11/1993 | Monroe et al. |
| 5,261,987 A | 11/1993 | Luening et al. |
| 5,262,860 A | 11/1993 | Fitzpatrick et al. |
| 5,267,334 A | 11/1993 | Normille et al. |
| 5,267,755 A | 12/1993 | Yamauchi et al. |
| 5,280,537 A | 1/1994 | Sugiyama et al. |
| 5,284,364 A | 2/1994 | Jain |
| 5,288,976 A | 2/1994 | Citron et al. |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,319,453 A | 6/1994 | Copriviza et al. |
| 5,319,724 A | 6/1994 | Blonstein et al. |
| 5,319,735 A | 6/1994 | Preuss et al. |
| 5,321,751 A | 6/1994 | Ray et al. |

| | | | | | | |
|---|---|---|---|---|---|---|
| 5,325,167 A | 6/1994 | Melen | | 5,734,119 A | 3/1998 | France et al. |
| 5,334,573 A | 8/1994 | Schild | | 5,734,752 A | 3/1998 | Knox |
| 5,336,657 A | 8/1994 | Egashira et al. | | 5,742,845 A | 4/1998 | Wagner |
| 5,337,361 A | 8/1994 | Wang et al. | | 5,761,686 A | 6/1998 | Bloomberg |
| 5,351,302 A | 9/1994 | Leighton et al. | | 5,765,152 A | 6/1998 | Erickson |
| 5,379,345 A | 1/1995 | Greenberg | | 5,768,426 A | 6/1998 | Rhoads |
| 5,380,695 A | 1/1995 | Chiang et al. | | 5,774,452 A | 6/1998 | Wolosewicz |
| 5,384,846 A | 1/1995 | Berson et al. | | 5,778,102 A | 7/1998 | Sandford, II et al. |
| 5,385,371 A | 1/1995 | Izawa | | 5,783,024 A | 7/1998 | Forkert |
| 5,387,013 A | 2/1995 | Yamauchi et al. | | 5,801,687 A | 9/1998 | Peterson et al. |
| 5,393,099 A | 2/1995 | D'Amato | | 5,804,803 A | 9/1998 | Cragun et al. |
| 5,394,274 A | 2/1995 | Kahn | | 5,809,139 A | 9/1998 | Girod et al. |
| 5,404,377 A | 4/1995 | Moses | | 5,809,317 A | 9/1998 | Kogan et al. |
| 5,408,542 A | 4/1995 | Callahan | | 5,809,633 A | 9/1998 | Mundigl et al. |
| 5,422,963 A | 6/1995 | Chen et al. | | 5,818,441 A | 10/1998 | Throckmorton et al. |
| 5,422,995 A | 6/1995 | Aoki et al. | | 5,825,892 A | 10/1998 | Braudaway et al. |
| 5,428,607 A | 6/1995 | Hiller et al. | | 5,828,325 A | 10/1998 | Wolosewicz et al. |
| 5,428,731 A | 6/1995 | Powers, III | | 5,841,886 A | 11/1998 | Rhoads |
| 5,432,870 A | 7/1995 | Schwartz | | 5,841,978 A | 11/1998 | Rhoads |
| 5,446,273 A | 8/1995 | Leslie | | 5,845,281 A | 12/1998 | Benson et al. |
| 5,448,053 A | 9/1995 | Rhoads | | 5,848,413 A | 12/1998 | Wolff |
| 5,449,200 A | 9/1995 | Andric et al. | | 5,848,424 A | 12/1998 | Scheinkman et al. |
| 5,450,490 A | 9/1995 | Jensen et al. | | 5,852,673 A | 12/1998 | Young |
| 5,463,209 A | 10/1995 | Figh et al. | | 5,857,038 A | 1/1999 | Owada et al. |
| 5,469,506 A | 11/1995 | Berson et al. | | 5,862,260 A | 1/1999 | Rhoads |
| 5,471,533 A | 11/1995 | Wang et al. | | 5,864,622 A | 1/1999 | Marcus |
| 5,473,631 A | 12/1995 | Moses | | 5,869,819 A | 2/1999 | Knowles et al. |
| 5,479,188 A | 12/1995 | Moriyama | | 5,871,615 A | 2/1999 | Harris |
| 5,493,677 A | 2/1996 | Balogh et al. | | 5,872,589 A | 2/1999 | Morales |
| 5,495,411 A | 2/1996 | Ananda | | 5,875,249 A | 2/1999 | Mintzer et al. |
| 5,495,581 A | 2/1996 | Tsai | | 5,879,502 A | 3/1999 | Gustafson |
| 5,496,071 A | 3/1996 | Walsh | | 5,892,900 A | 4/1999 | Ginter et al. |
| 5,499,294 A | 3/1996 | Friedman | | 5,893,910 A | 4/1999 | Martineau et al. |
| 5,515,081 A | 5/1996 | Vasilik | | 5,900,608 A | 5/1999 | Iida |
| 5,524,933 A | 6/1996 | Kunt et al. | | 5,902,353 A | 5/1999 | Reber et al. |
| 5,530,852 A | 6/1996 | Meske, Jr. et al. | | 5,903,729 A | 5/1999 | Reber et al. |
| 5,548,645 A | 8/1996 | Ananda | | 5,905,248 A | 5/1999 | Russell et al. |
| 5,550,346 A | 8/1996 | Andriash et al. | | 5,905,251 A | 5/1999 | Knowles |
| 5,553,143 A | 9/1996 | Ross et al. | | 5,913,210 A | 6/1999 | Call |
| 5,560,799 A | 10/1996 | Jacobsen | | 5,915,027 A | 6/1999 | Cox et al. |
| 5,579,479 A | 11/1996 | Plum | | 5,918,213 A | 6/1999 | Bernard et al. |
| 5,579,694 A | 12/1996 | Mailloux | | 5,918,214 A | 6/1999 | Perkowski |
| 5,594,226 A | 1/1997 | Steger | | 5,920,861 A | 7/1999 | Hall et al. |
| 5,594,809 A | 1/1997 | Kopec et al. | | 5,920,878 A | 7/1999 | DeMont |
| 5,612,943 A | 3/1997 | Moses et al. | | 5,926,822 A | 7/1999 | Garman |
| 5,613,004 A | 3/1997 | Cooperman et al. | | 5,930,377 A | 7/1999 | Powell et al. |
| 5,629,980 A | 5/1997 | Stefik et al. | | 5,930,767 A | 7/1999 | Reber et al. |
| 5,634,012 A | 5/1997 | Stefik et al. | | 5,932,863 A | 8/1999 | Rathus et al. |
| 5,635,012 A | 6/1997 | Belluci et al. | | 5,933,829 A | 8/1999 | Durst et al. |
| 5,636,276 A | 6/1997 | Brugger | | 5,938,726 A | 8/1999 | Reber et al. |
| 5,638,443 A | 6/1997 | Stefik et al. | | 5,938,727 A | 8/1999 | Ikeda |
| 5,640,193 A | 6/1997 | Wellner | | 5,939,695 A | 8/1999 | Nelson |
| 5,640,647 A | 6/1997 | Hube | | 5,939,699 A | 8/1999 | Perttunen et al. |
| 5,646,997 A | 7/1997 | Barton | | 5,940,595 A | 8/1999 | Reber et al. |
| 5,646,999 A | 7/1997 | Saito | | 5,949,055 A | 9/1999 | Fleet et al. |
| 5,652,626 A | 7/1997 | Kawakami et al. | | 5,950,173 A | 9/1999 | Perkowski |
| 5,652,714 A | 7/1997 | Peterson et al. | | 5,955,021 A | 9/1999 | Tiffany, III |
| 5,657,462 A | 8/1997 | Brouwer et al. | | 5,963,916 A | 10/1999 | Kaplan |
| 5,659,164 A | 8/1997 | Schmid et al. | | 5,969,324 A | 10/1999 | Reber et al. |
| 5,659,726 A | 8/1997 | Sandford, II et al. | | 5,971,277 A | 10/1999 | Cragun et al. |
| 5,663,766 A | 9/1997 | Sizer, II | | 5,974,141 A | 10/1999 | Saito |
| 5,665,951 A | 9/1997 | Newman et al. | | 5,974,548 A | 10/1999 | Adams |
| 5,668,636 A | 9/1997 | Beach et al. | | 5,978,773 A | 11/1999 | Hudetz et al. |
| 5,671,282 A | 9/1997 | Wolff et al. | | 5,979,757 A | 11/1999 | Tracy et al. |
| 5,673,316 A | 9/1997 | Auerbach et al. | | 5,983,218 A | 11/1999 | Syeda-Mahmood |
| 5,680,223 A | 10/1997 | Cooper et al. | | 5,991,876 A | 11/1999 | Johnson et al. |
| 5,684,885 A | 11/1997 | Cass et al. | | 6,003,581 A | 12/1999 | Aihara |
| 5,687,236 A | 11/1997 | Moskowitz et al. | | 6,007,660 A | 12/1999 | Forkert |
| 5,689,620 A | 11/1997 | Kopec et al. | | 6,024,287 A | 2/2000 | Takai et al. |
| 5,694,471 A | 12/1997 | Chen et al. | | 6,036,099 A | 3/2000 | Leighton |
| 5,706,364 A | 1/1998 | Kopec et al. | | 6,049,463 A | 4/2000 | O'Malley et al. |
| 5,715,403 A | 2/1998 | Stefik | | 6,052,486 A | 4/2000 | Knowlton et al. |
| 5,721,788 A | 2/1998 | Powell et al. | | 6,064,764 A | 5/2000 | Bhaskaran et al. |

| | | |
|---|---|---|
| 6,066,594 A | 5/2000 | Gunn et al. |
| 6,101,602 A | 8/2000 | Fridrich |
| 6,111,506 A | 8/2000 | Yap et al. |
| 6,122,403 A | 9/2000 | Rhoads |
| 6,131,161 A | 10/2000 | Linnartz |
| 6,157,330 A | 12/2000 | Bruekers et al. |
| 6,159,327 A | 12/2000 | Forkert |
| 6,160,526 A | 12/2000 | Hirai et al. |
| 6,163,842 A | 12/2000 | Barton |
| 6,205,249 B1 | 3/2001 | Moskowitz |
| 6,243,480 B1 | 6/2001 | Zhao et al. |
| 6,256,736 B1 | 7/2001 | Coppersmith et al. |
| 6,283,188 B1 | 9/2001 | Maynard et al. |
| 6,286,036 B1 | 9/2001 | Rhoads |
| 6,286,761 B1 | 9/2001 | Wen |
| 6,289,108 B1 | 9/2001 | Rhoads |
| 6,292,092 B1 | 9/2001 | Chow et al. |
| 6,302,444 B1 | 10/2001 | Cobben |
| 6,311,214 B1 | 10/2001 | Rhoads |
| 6,321,981 B1 | 11/2001 | Ray et al. |
| 6,324,573 B1 | 11/2001 | Rhoads |
| 6,343,138 B1 | 1/2002 | Rhoads |
| 6,369,919 B1 * | 4/2002 | Drinkwater et al. ............ 359/2 |
| 6,389,151 B1 | 5/2002 | Carr et al. |
| 6,408,082 B1 | 6/2002 | Rhoads et al. |
| 6,478,228 B1 | 11/2002 | Ikefuji et al. |
| 6,536,665 B1 | 3/2003 | Ray et al. |
| 6,580,819 B1 | 6/2003 | Rhoads |
| 6,614,914 B1 | 9/2003 | Rhoads et al. |
| 6,650,761 B1 | 11/2003 | Rodriguez et al. |
| 6,681,028 B2 | 1/2004 | Rodriguez et al. |
| 6,752,432 B1 | 6/2004 | Richardson |
| 6,817,530 B2 | 11/2004 | Labrec et al. |
| 6,923,378 B2 | 8/2005 | Jones et al. |
| 6,947,571 B1 | 9/2005 | Rhoads et al. |
| 6,959,098 B1 | 10/2005 | Alattar |
| 7,185,201 B2 | 2/2007 | Rhoads et al. |
| 7,206,820 B1 | 4/2007 | Rhoads et al. |
| 7,289,643 B2 | 10/2007 | Brunk et al. |
| 2001/0002035 A1 | 5/2001 | Kayanakis |
| 2002/0023218 A1 | 2/2002 | Lawandy et al. |
| 2002/0027359 A1 | 3/2002 | Cobben et al. |
| 2002/0070280 A1 | 6/2002 | Ikefuji et al. |
| 2002/0170966 A1 | 11/2002 | Hannigan |
| 2003/0010830 A1 * | 1/2003 | Curtis ........................ 235/491 |
| 2003/0038174 A1 | 2/2003 | Jones |
| 2003/0040957 A1 | 2/2003 | Lastra |
| 2003/0152250 A1 * | 8/2003 | Pewzner et al. ............. 382/115 |
| 2004/0041804 A1 | 3/2004 | Ives et al. |
| 2004/0219302 A1 * | 11/2004 | Krause et al. ............... 427/496 |
| 2005/0109850 A1 | 5/2005 | Jones |
| 2005/0129281 A1 * | 6/2005 | Ashizaki et al. ............. 382/112 |
| 2006/0035034 A1 * | 2/2006 | Matsumoto et al. ......... 427/487 |
| 2006/0055169 A1 * | 3/2006 | Reinhart ...................... 283/72 |

FOREIGN PATENT DOCUMENTS

| | | |
|---|---|---|
| DE | 3806411 | 9/1989 |
| EP | 058482 A1 | 8/1982 |
| EP | 372601 A1 | 6/1990 |
| EP | 411232 A2 | 2/1991 |
| EP | 441702 A1 | 8/1991 |
| EP | 479295 A1 | 4/1992 |
| EP | 493091 A1 | 7/1992 |
| EP | 581317 A2 | 2/1994 |
| EP | 629972 | 12/1994 |
| EP | 642060 | 3/1995 |
| EP | 650146 A1 | 4/1995 |
| EP | 705025 A2 | 4/1996 |
| GB | 1472581 | 5/1977 |
| GB | 2063018 | 5/1981 |
| GB | 2067871 | 7/1981 |
| GB | 2196167 | 4/1988 |
| GB | 2204984 | 11/1988 |
| GB | 2325765 | 12/1998 |
| JP | 3185585 | 8/1991 |
| JP | 4248771 | 9/1992 |
| JP | 5242217 | 9/1993 |
| JP | 7115474 | 5/1995 |
| JP | 10171758 | 6/1998 |
| JP | 10177613 | 6/1998 |
| JP | 11259620 | 9/1999 |
| JP | 2001138643 * | 5/2001 |
| WO | WO-8204149 A1 | 11/1982 |
| WO | WO-8908915 A1 | 9/1989 |
| WO | WO-9427228 A1 | 11/1994 |
| WO | WO-9510835 A1 | 4/1995 |
| WO | WO-9514289 A2 | 5/1995 |
| WO | WO-9520291 A1 | 7/1995 |
| WO | WO-9627259 A1 | 9/1996 |
| WO | WO-9636163 A2 | 11/1996 |
| WO | WO-9743736 A1 | 11/1997 |
| WO | WO-9814887 A1 | 4/1998 |
| WO | WO-9820642 A1 | 5/1998 |
| WO | WO-9824050 A1 | 6/1998 |
| WO | WO-9840823 A1 | 9/1998 |
| WO | WO-9849813 A1 | 11/1998 |
| WO | WO-9934277 A2 | 7/1999 |
| WO | WO-0043216 A1 | 7/2000 |
| WO | WO-0143080 A1 | 6/2001 |
| WO | WO-02095677 A2 | 11/2002 |

OTHER PUBLICATIONS

U.S. Appl. No. 60/082,228, filed Apr. 16, 1998, Rhoads.
U.S. Appl. No. 60/141,763, Davis.
U.S. Appl. No. 60/158,015, filed Oct. 6, 1999, Davis.
U.S. Appl. No. 60/341,569, filed Dec. 18, 2001, LaBrec.
U.S. Appl. No. 60/344,683, filed Dec. 24, 2001, LaBrec.
U.S. Appl. No. 60/344,718, filed Dec. 24, 2001, LaBrec.
U.S. Appl. No. 60/356,881, filed Feb. 12, 2002, Hannigan.
U.S. Appl. No. 60/358,321, filed Feb. 19, 2002, Munday.
U.S. Appl. No. 09/343,104, filed Jun. 29, 1999, Rodriguez.
U.S. Appl. No. 09/531,076, filed Mar. 18, 2000, Rhoads.
U.S. Appl. No. 09/562,517, Davis et al.
U.S. Appl. No. 09/631,409, filed Aug. 3, 2000, Brundage.
U.S. Appl. No. 09/679,261, filed Oct. 4, 2000, Davis.
U.S. Appl. No. 10/094,593, Hannigan.
"Access Control and Copyright Protection for Images WorkPackage 8: Watermarking" Jun. 30, 1995, 46 pages.
"Access Control and Copyright Protection for Images, Conditional Access and Copyright Protection Based on the Use of Trusted Third Parties," 1995, 43 pages.
"Access Control and Copyright Protection for Images, WorkPackage 3: Evaluation of Existing Systems," Apr. 19, 1995, 68 pages.
"Access Control and Copyright Protection for Images, WorkPackage 1: Access Control and Copyright Protection for Images Need Evaluation," Jun. 1995, 21 pages.
"Copyright Protection for Digital Images, Digital Fingerprinting from FBI,"Highwater FBI brochure 1995, 4 pages.
"Cyphertech Systems: Introduces Digital Encoding Device to Prevent TV Piracy," Hollywood Reporter, Oct. 20, 1993, p. 23.
"Foiling Card Forges With Magnetic Noise," Wall Street Journal, Feb. 8, 1994.
"High Water FBI Limited Presentation Image Copyright Protection Software," FBI Ltd. brochure, Jul., 1995, 17 pages.
"The Copyright Can of Worms Opened Up By The New Electronic Media," Computergram Internations, pCGN07170006, Jul. 17, 1995 and The Copyright Can of Worms Opened Up By the New Electronic Media-2, Computergram Internations, pCGN07210008, Jul. 21, 1995, 3 pages.
Arachelian, "White Noise Storm," Apr. 11, 1994, Internet reference, 13 pages.
Arthur, "Digital Fingerprints Protect Artwork," New Scientist, Nov. 12, 1994, p. 24.

Bender et al., "Techniques for Data Hiding,"Massachusetts Institute of Technology, Media Laboratory, Jan. 1995, 10 pages.

Boland et al, "Watermarking Digital Images for Copyright Protection,"Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Bovik, "Handbook of Image and Video Processing," Academic Press, 2000, pp. 133-136, 154, 155.

Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.

Brown, "S-Tools for Windows, Version 1.00, COPYRGT. 1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.

Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.

Castro et al., "Registration of Translated and Rotated Images Using Finite Fourier Transforms," IEEE Transactions on Pattern Analysis and Machine Intelligence, vol. PAMI-9, No. 5, Sept. 1987, pp. 700-703.

Choudhury , et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

Collins et al., "Using Bar Code—Why It's Taking Over", Second Edition, Data Capture Institute, 1990 (Contents & Index). (U.S. Appl. No. 10/094,593).

Dautzenberg, "Watermarking Images," Department of Microelectronics and Electrical Engineering, Trinity College Dublin, 47 pages, Oct. 1994.

Fitzgerald, "Invisible Digital Copyright ID," Editor & Publisher, Jun. 25, 1994, p. 62.

Friedman, "The Trustworthy Digital Camera: Restoring Credibility to the Photographic Image," IEEE Transaction on Consumer Electronics, vol. 39, No. 4, Nov., 1993, pp. 905-910.

Grieco, Jr. et al., "Behind Bars—Bar Coding Principles and Applications", PT Publication, Inc., 1989 (Table of Contents & Index) (U.S. Appl. No. 10/094,593).

Hecht, "Embedded Data Glyph Technology for Hardcopy Digital Documents," SPIE vol. 2171, Feb. 1994, pp. 341-352.

Humphrey, "Stamping Out Crime", Hollywood Reporter, Jan. 26, 1994, p. S48.

Jain, "Image Coding Via a Nearest Neighbors Image Model", IEEE Transactions on Communications, vol. Com-23, No. 3, Mar. 1975, pp. 318-331.

JPEG Group's JPEG Software (release 4), FTP.CSUA. BEREKELEY.EDU/PUB/CYPHERPUNKS/APPLICATIONS/ JSTEG/JPEG.ANNOUNCEMENT.GZ, Jun. 7, 1993, 2 pages.

Kassam, Signal Detection in Non-Gaussian Noise, Dowden & Culver, 1988, pp. 1-96.

Kawagucki, et al., "Principle and Applications of BPCS-Streganography," Proc. SPIE vol. 3258: Multimedia Systems and Applications, Nov. 2-4,1998, pp. 464-473.

Koch, et al., "Copyright Protection for Multimedia Data," Fraunhofer Institute for Computer Graphics, Dec. 16, 1994, 15 pages.

Koch, et al., "Towards Robust and Hidden Image Copyright Labeling," Proc. of 1995 IEEE Workshop on Nonlinear Signal and Image Processing, Jun. 20-22, 1995 4 pages.

Komatsu et al., "Authentication System Using Concealed Image in Telematics," Memoirs of the School of Science & Engineering, Waseda Univ., No. 52, 1988, pp. 45-60.

Komatsu, et al., "A Proposal on Digital Watermarking in Document Image Communication and Its Application to Realizing a Signature," Electronics and Communications in Japan, Part I, vol. 73, No. 5, 1990, pp. 22-23.

Kurak et al., "A Cautionary Note On Image Downgrading," 1992 IEEE, pp. 153-159.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Video-Steganography: How to Secretly Embed a Signature in a Picture," IMA Intellectual Property Project Proceedings, Jan. 1995, vol. 1, Issue 1, pp. 187-205.

Matthews, "When Seeing is Not Believing," New Scientist, Oct. 16, 1993, pp. 13-15.

Mintzer et al., "Safeguarding Digital library Contents and Users Digital watermarking," D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

"NAB-Cyphertech Starts Anti-Piracy Broadcast Tests", Newsbytes, NEW03230023, Mar. 23, 1994.

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Palmer, "The Bar Code Book", Third Edition, Helmers Publishing, Inc., 1995 (Contents & Index) (U.S. Appl. No. 10/094,593).

Pennebaker et al., JPEG Still Image Data Compression Standard, Chapter 3, "Aspects of the Human Visual System," pp. 23-27, 1993 Van Nostrand Reinhold, New York.

Pitas et al., "Applying Signatures on Digital Images," IEEE Workshop on Nonlinear and Signal Processing, Neos Marmaras, Greece, pp. 460-463, Jun. 1995.

Port, "halting Highway Robbery on the Internet," Business Week, Oct. 17, 1994, p. 212.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise", IRE Trans. On Information Theory, vol. 8, No. 2, Feb. 1962, pp. 145-154.

Sandford II, et al., "The Data Embedding Method," SPIE vol. 2615, Oct. 23, 1995, pp. 226-259.

Sapwater et al., "Electronic Copyright Protection," PHOTO>Electronic Imaging, vol. 37, No. 6, 1994, pp. 16-21.

Schneier, "Digital Signatures, Cryptographic Algorithms Can Create Nonforeable Signatures for Electronic Documents, Making Them Valid Legal Instruments" BYTE, No. 1993, pp. 309-312.

Schreiber et al., "A Compatible High-Definition Television System Using the Noise-Margin Method of Hiding Enhancement Information,"SMPTE Journal, Dec. 1989, pp. 873-879.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun. 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979. (U.S. Appl. No. 10/094,593).

Szepanski, "Additive Binary Data Transmiision for Video Signals", Papers Presented at Conf. of Comm. Engineering Soc., Sep. 30-Oct. 3, 1980, Technical Reports, vol. 74, pp. 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec., 1993, pp. 666-673.

Toga et al., "Registration Revisited," Journal of Neuroscience Methods, 48 (1993), pp. 1-13.

van Schyndel et al., "A Digital Watermark," IEEE International Conference on Image Processing, Nov. 13-16, 1994, pp. 86-90.

Wagner, "Fingerprinting," 1983 IEEE, pp. 18-22.

Walton, "Image Authentication for a Slippery New Age," Dr. Dobb's Journal, Apr. 1995, pp. 18-26, 82-87.

Weber et al., "Correlative Image Registration," Seminars in Nuclear Medicine, vol. XXIV, No. 4, Oct. 1994, pp. 311-323.

* cited by examiner

132

130

(B)

(A)

120

IDENTIFICATION DOCUMENT WITH THREE DIMENSIONAL IMAGE OF BEARER

RELATED APPLICATION DATA

This application claims the benefit of U.S. Provisional Patent Application No. 60/507,582, filed Sep. 30, 2003.

This application is also a continuation in part of U.S. patent application Ser. No. 10/325,434 filed Dec. 18, 2002 (published as US 2003-0183695 A1).

Each of the above patent documents is herein incorporated by reference in its entirety.

TECHNICAL FIELD

The invention generally relates to identification and security documents, and in particular, relates to a document structure and a method of making the document structure that conveys a three dimensional image of the bearer.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint, a facial image or template, or iris or retinal template), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate), which has a layer for receiving the dyes transferred imagewise from the donor sheets. Thermal dye transfer methods are described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiver, to produce a continuous tone image. D2T2 can have an increased cost as compared to other methods, however, because of the special dyes needed and the cost of D2T2 ribbons. Also, the quality of D2T2-printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

In addition to these forms of printing, other forms of printing and applying variable data are used in ID documents, including ink jet printing, laser printing and laser engraving.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly (vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

Despite the increasing sophistication of security features on identification documents, the challenge of counterfeiting still persists, particularly in markets where it is not economically feasible to use a variety of high end security devices to raise the bar for counterfeiters. Preferably, the security features should be difficult to copy, yet inexpensive to produce. One form of security feature is a lenticular lens system, which may be used to create human verifiable visual effects.

The invention provides an identification document structure that gives the photo on the document a three dimensional effect. It also provides related methods making the document, software for processing the images to create the effect and document components that include the feature.

One aspect of the invention is an identification document with the three dimensional photo effect. The document includes two or more document layers. There is a lens structure in one of the document layers, and it includes lens elements. A photo is printed on one or more of the document layers. The photo depicts a subject, and includes two or more separate images of the subject from different perspectives. Parts of the separate images are interleaved together into sets, and the sets are positioned relative to corresponding lens elements of the lens structure. These sets include parts of the separate images such that when viewed through the lens structure, the parts are viewed simultaneously making the subject appear three-dimensional to a viewer.

This document structure may be used to carry a three dimensional facial image of the bearer, which enables visual verification of the document. The images may be created using one or more separate capture systems (e.g., separate cameras positioned around the subject at different perspectives, a single camera with multiple optical systems to capture the subject from different perspectives, a single camera moved to different positions around the subject, etc.). The images may also be derived from a single image of the bearer using three dimensional modeling software.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein.

Figure 1:
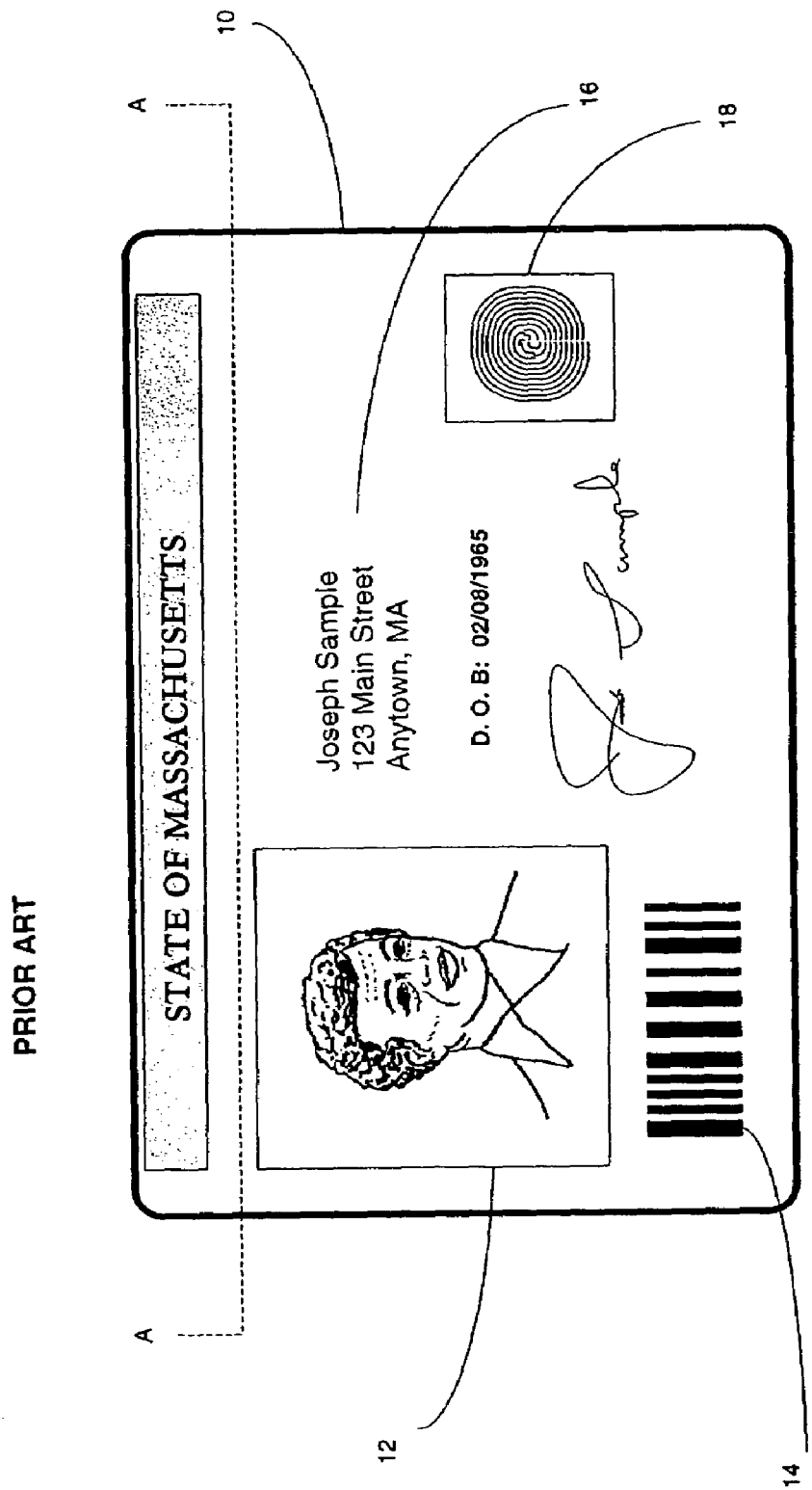
FIG. 1 is an illustrative example of a prior art identification document.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils.

Lamination of any laminate layer(s) to any other layer of material (e.g., a core layer) can be accomplished using any conventional lamination process, and such processes are well-known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways. For example, in at least some embodiments, the invention is usable with virtually any product which is made to carry an optical memory device, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

Figure 2:
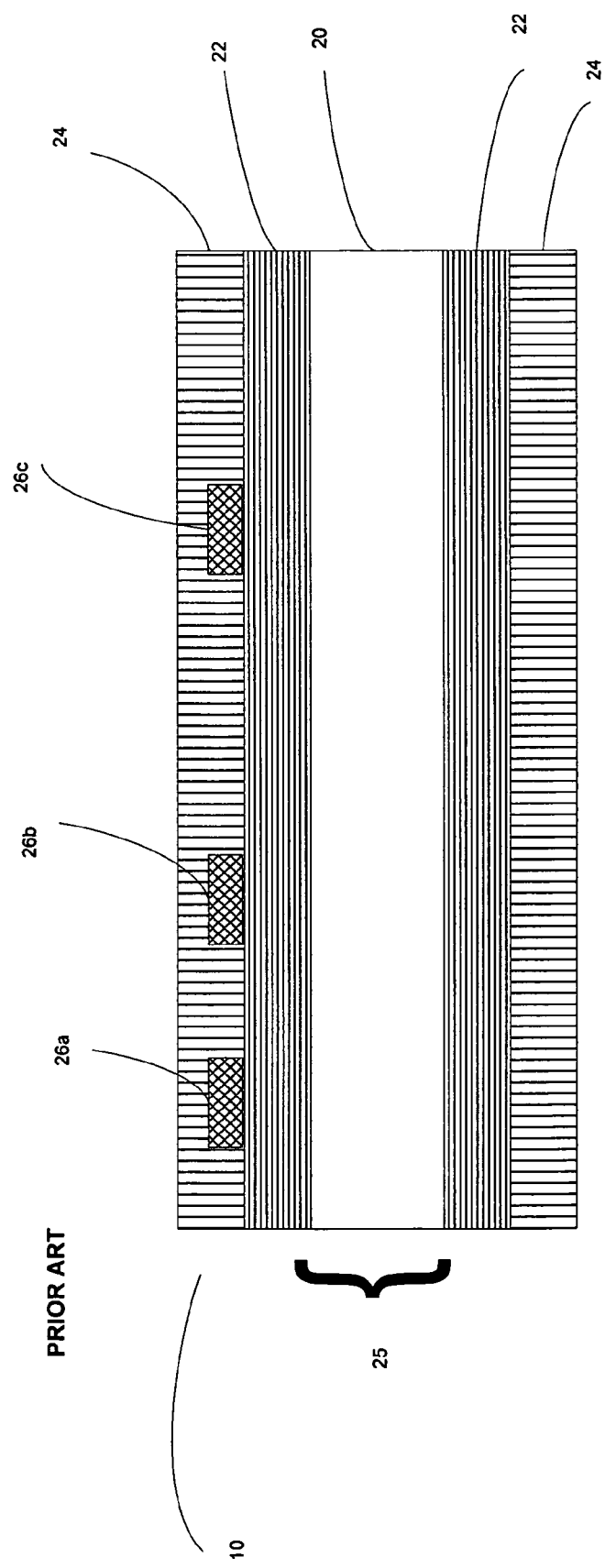
FIG. 2 is an illustrative cross section of the prior art identification document of FIG. 1, taken along the A-A line.

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (such as, for example, white polyvinyl chloride (PVC) material) that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26a-c is printed on the card blank 25 using a method such as Dye Diffusion Thermal Transfer ("D2T2") printing (described further in commonly assigned U.S. Pat. No. 6,066,594, which is incorporated hereto by reference in its entirety.) The information 26a-c can, for example, comprise an indicium or indicia, such as the invariant or nonvarying information common to a large number of identification documents, for example the name and logo of the organization issuing the documents. The information 26a-c may be formed by any known process capable of forming the indicium on the specific core material used.

To protect the information 26a-c that is printed, an additional layer of overlaminate 24 can be coupled to the card blank 25 and printing 26a-c using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

Because ID documents 10 can be used to enable and facilitate personal identification, it often is desirable to manufacture the ID document 10 in a manner to deter counterfeiting and/or fraudulent alteration. There are a number of known ways to increase the security of ID documents 10, including methods that incorporate additional information or security features and methods that adapt existing information on the card to help prevent or make evident fraud. For example, numerous types of laminations have been employed in which the information-bearing surface is heat or solvent-laminated to a transparent surface. The materials for and the process of lamination are selected such that if an attempt is made to uncover the information-bearing surface for amendment thereof, the surface is destroyed, defaced or otherwise rendered apparent the attempted intrusion.

While an identification card that essentially cannot be disassembled without being destroyed may provide suitable resistance against fraudulent alteration, it might not significantly challenge all attempts of counterfeiting. The counterfeiting of identification cards also can involve the fabrication and issuance of identification cards by persons not authorized to do so. Such counterfeiting presents additional and different security problems to the art. One possible way of preventing fraudulent fabrication and issuing could involve strict control over the possession of the materials and equipment involved in the fabrication of the identification card. In some instances, however, this approach is impractical and/or impossible, especially if any of the materials involved are commercially available and used in other applications.

One response to the counterfeiting problem has involved the integration of verification features that are difficult to copy by hand or by machine. One such verification feature is the use in the card of a signature of the card's issuer or bearer. Other verification features have involved, for example, the use of watermarks, biometric information, microprinting, fluorescent materials, fine line details, validation patterns or marking, and polarizing stripes. These verification features are integrated into an identification card in various ways and they may be visible or invisible in the finished card. If invisible, they can be detected by viewing the feature under conditions which render it visible.

At least some of the verification features discussed above have been employed to help prevent and/or discourage counterfeiting. However, at least some of the features can be expensive and, in the case of features hidden from casual visual inspection, require specialized equipment and trained operator for authentication. It would be advantageous if an ID document included a security feature that would be difficult to reproduce either in a counterfeited document or by the fraudulent alteration of an original, but would for authentication require neither specialized equipment nor trained operators.

One possible solution is to provide visible, self-authenticating security features on cards is using a so-called lenticular lens and lenticular image. A lenticular image is comprised of a sequence of images that are interlaced to form a singular image, where each individual image (or frame) is viewable at a different angle to the viewer when viewed through a lenticular lens. These various images are termed views.

For example, U.S. Pat. No. 4,869,946 ("the '946 patent") issued Sep. 26, 1989 describes a tamperproof security card comprised of a transparent upper layer having narrow parallel lenses on the outer surface, and an image containing substrate, the two layers forming a lenticular system by which images on the substrate are selectively visible depending upon the angle from which the card is viewed. The disclosure of this patent, insofar as it relates to the structure and operation of lenticular systems, is incorporated herein by reference. The embodiments disclosed in the '946 patent appear to contemplate having lenticular lens material over the entire surface of a card. In addition, the '946 patent states that the individual data image which is to be viewed through the lenticular lens is formed by laying down a photographic emulsion on an image substrate layer by means of a lenticular system (col. 3, lines 11-20).

It is further anticipated that the invention could even have applicability in manufacturing articles which are to have a multiple image feature formed thereon, but where the multiple image feature is not necessarily provided as a security feature. For example, it is anticipated that the invention has applicability in forming decorative multiple image features and/or customized multiple image features.

In one embodiment, the invention provides a novel information-bearing laminar assembly that would be suitable for use as or incorporated into an identification document, such as the ID document 10 of FIG. 1. The information-bearing laminar assembly of this embodiment is characterized by the provision therein, as a security feature, a lenticular lens portion disposed on an outer transparent layer, which provides multiple images in conjunction with information printed on an information-bearing layer. In at least one embodiment, the multiple images include at least one image that includes variable/personal information. In at least one embodiment, the multiple images include at least one color image, such as a full color portrait.

Figure 3:
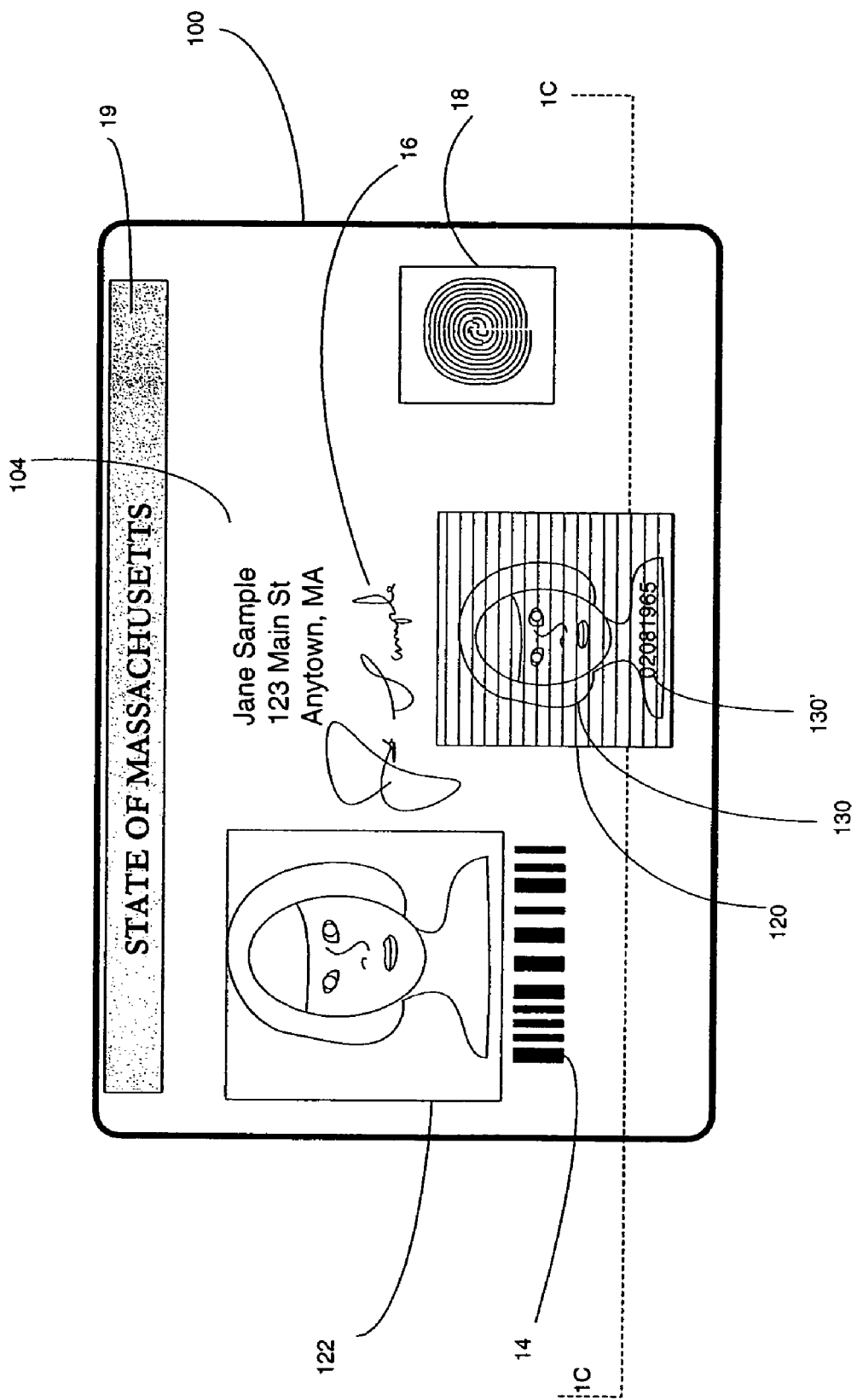
FIG. 3 is a view of an ID document illustrating the multiple images, in accordance with one embodiment of the invention.
Figure 4:
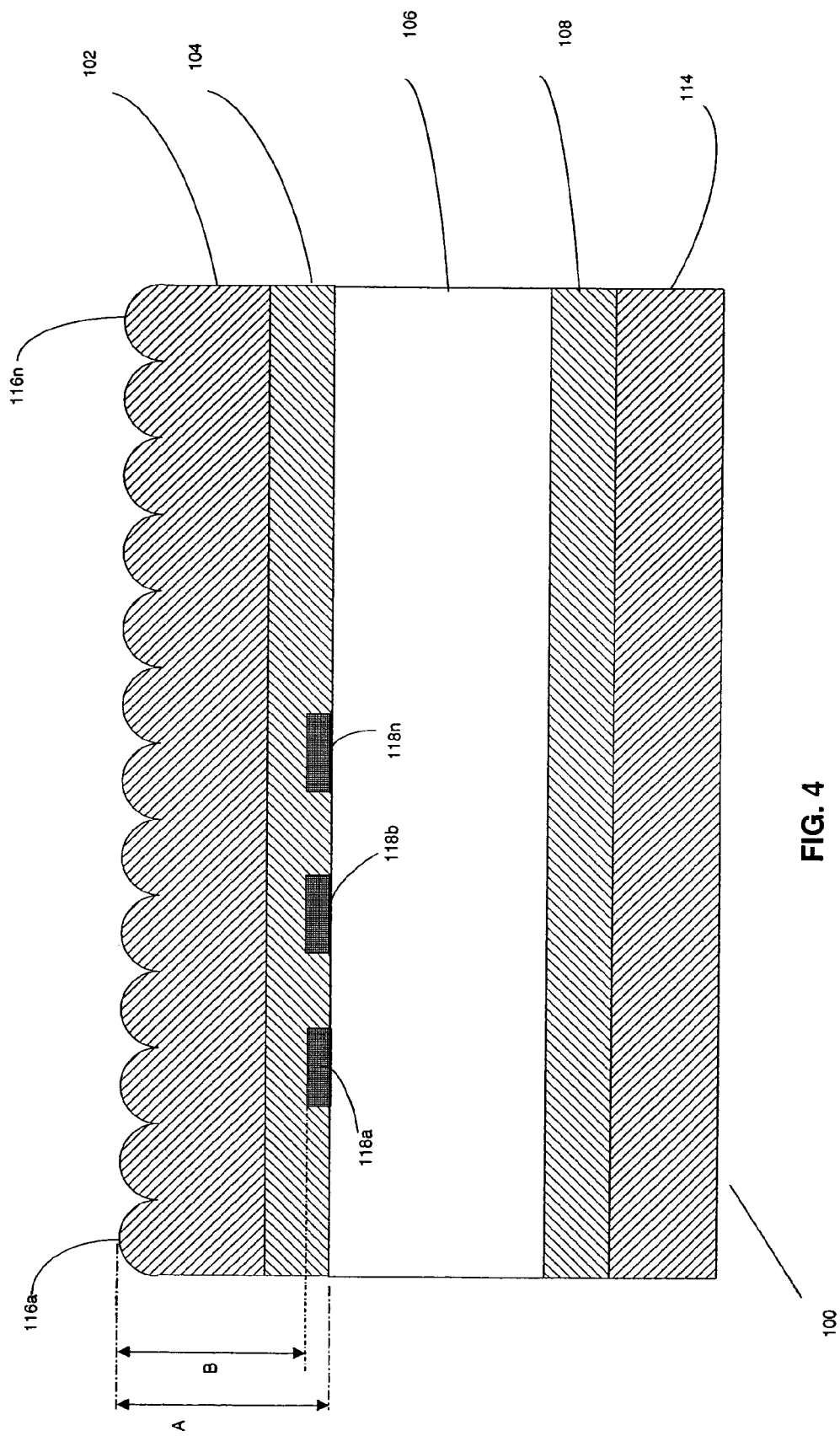
FIG. 4 is a cross-sectional schematic view of the ID document of FIG. 3, taken generally across line IC-IC of FIG. 3.
Figure 5:
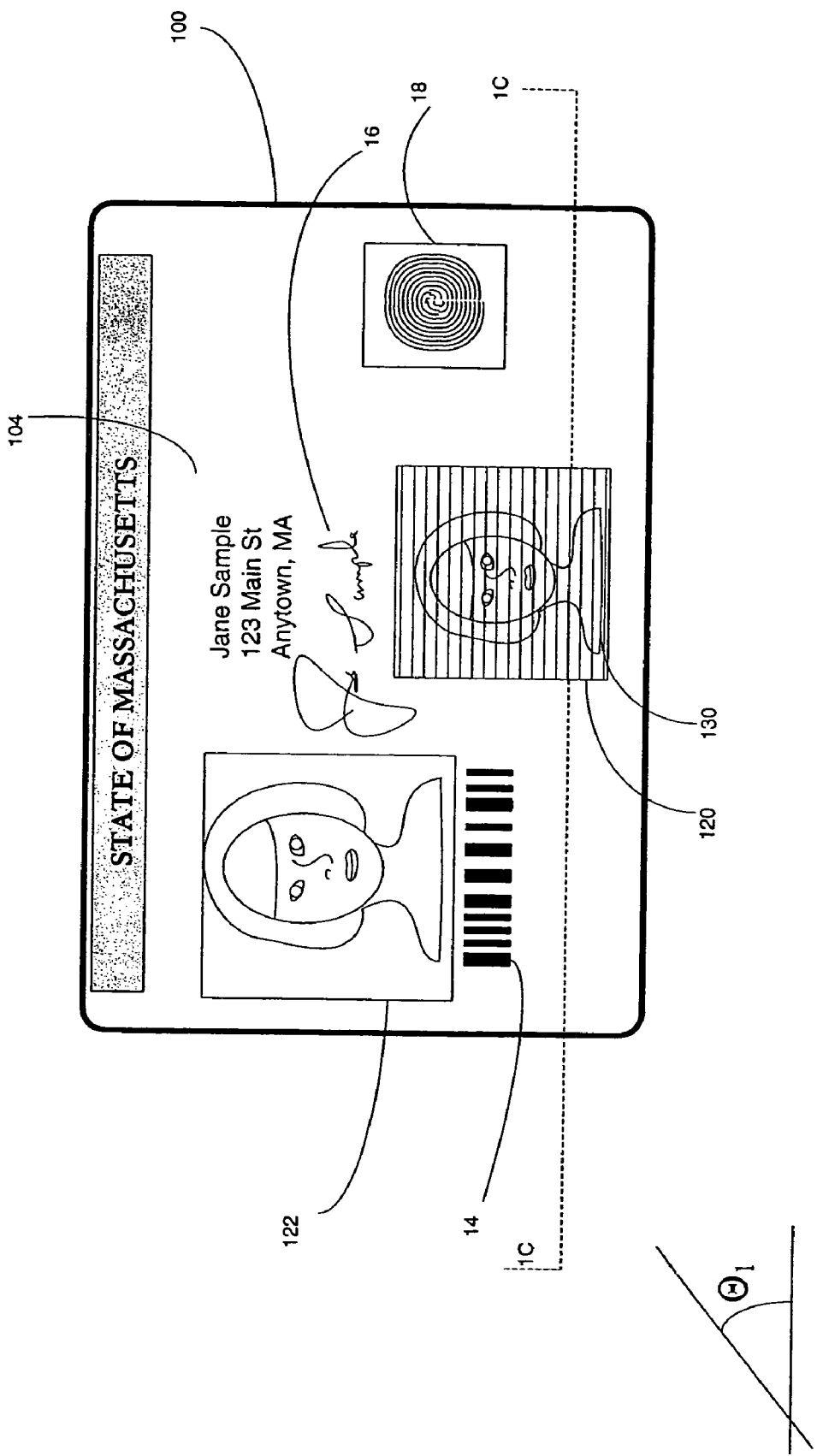
FIG. 5 is a top schematic view of the ID document of FIG. 3, viewed from a first angle.
Figure 6:
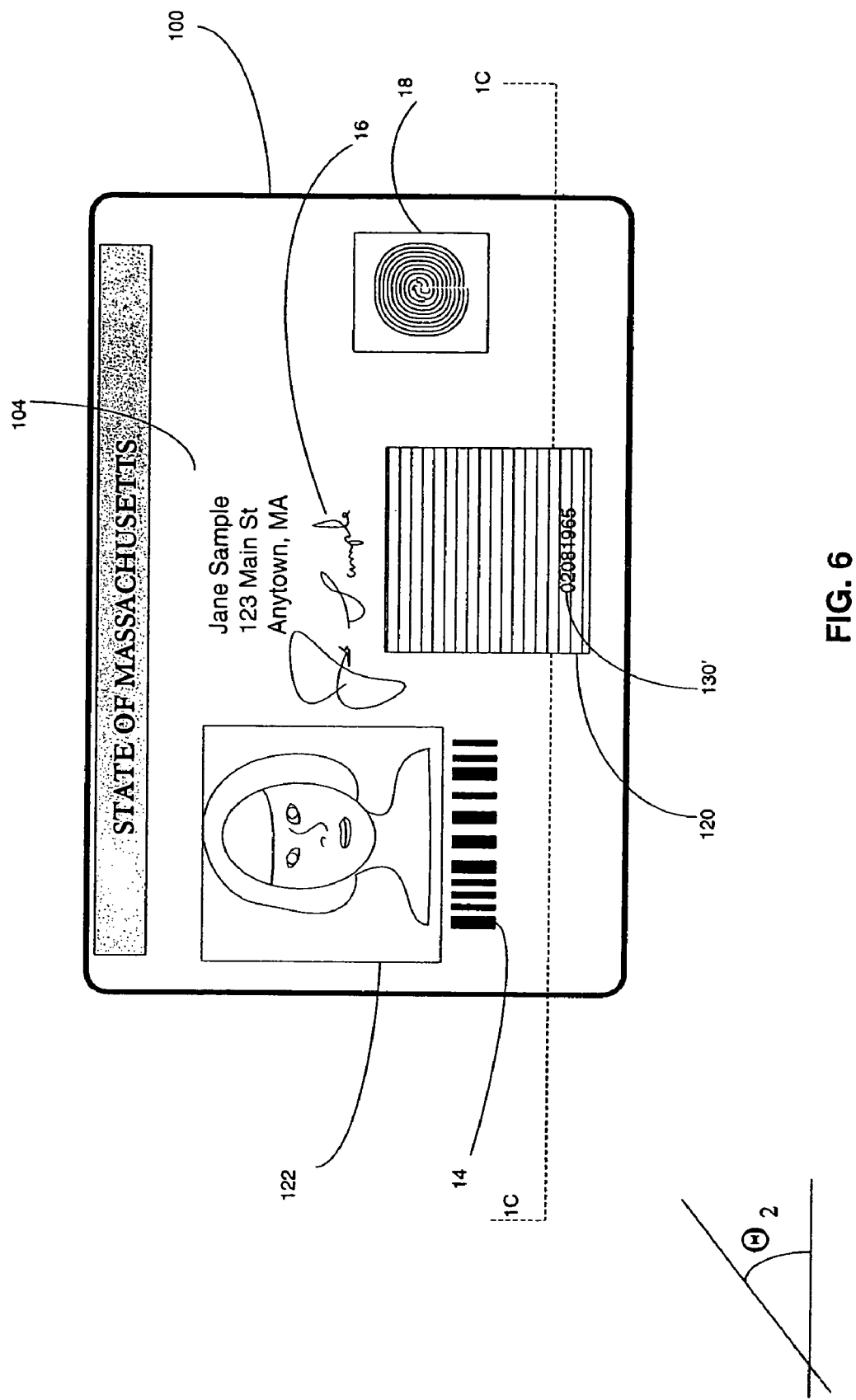
FIG. 6 is a top schematic view the ID document of FIG. 3, viewed from a second angle.

FIG. 3 is a view of an information bearing laminar assembly 100 (also referred to as ID card 100) illustrating the multiple images, in accordance with one embodiment of the invention, and FIG. 4 is a cross-sectional schematic view of the ID card 100 of FIG. 3, taken generally across line 1C-1C of FIG. 3. Note that the view of FIG. 3, in which both of the variable images are visible, is not a view that necessarily can be seen by a user, but is merely provided to illustrate the juxtaposition and location of the multiple images. As the ID card 100 is rotated, the security images 130, 130' appear to "disappear" as shown in FIGS. 5 and 6. The disappearance of the image is due to the focus of the lens in the areas of no print. As the ID card 100 is rotated about its horizontal axis, the focal point of the lens moves vertically up or down and oscillates between the two images. The lens feature magnifies the print located at this focal point, resulting in expanding the print to appear as a continuous single image. In at least one embodiment, instead of lines, individual dots (e.g., of ink or toner) could be used to represent the line and the feature would work in the same manner.

Referring to FIGS. 3 and 4, the ID card 100 includes an information-bearing layer 106 having a first surface 104. The first surface 104 includes a multiple image portion 120 which further includes first and second security images 130, 130'. For illustrative purposes only, the first security image 130 is shown as a reduced size portrait 130 (which, for security purposes, can match the standard size portrait 122), and the second security image 130', is shown to be a birthdate. The first and second security images 130, 130' can, however, be virtually any type of information that is useful and/or usable, given the type and use of the ID card 100. For example, the first and second security images 130, 130' can be any pair chosen from information such as biometric information (e.g., fingerprint), signatures, birthdates, serial numbers, government identification numbers (e.g., Social Security Numbers), images of the bearer of the ID card 100, address, account number, security classification, expiration date, and the like. Although it is advantageous for security purposes that one or both of the first and second security images 130, 130' include variable/personal information, in at least one embodiment it is not necessary that either (or both) security images comprise variable information. In one embodiment, for example, the first and second security images 130, 130' could comprise nonvarying information, especially if the nonvarying information is printed using a substance (e.g., optically varying or non-visible ink) that increases the difficulty of copying the ID card 100. In one embodiment either or both of the security images could comprise pre-printed fixed or nonvarying information. Furthermore, those skilled in the art will appreciate that many different types of information (in fact, virtually any type of information) is usable. For example, in one embodiment of the invention, either or both of the security images are color images, such as single color images, pearlescent colors, rainbow colors, multicolors, and full colors.

Note that the invention is not limited to using any specific inks or equipment to print any of the features, including the interlaced images described herein. Inks such as ultraviolet (UV), infrared (IR), etc. are usable in at least some embodiments of the invention, as well as inks that are toner-based and/or UV-curable. Further, in at least some embodiments of the invention, the equipment and/or printing presses used can include offset, digital variable offset, inkjet, laser toner-based, etc.

It also will be appreciated that the first and second security images 130, 130', in at least some embodiments, can even comprise the same image or different forms of the same image. For example, the first security image 130 could be a front facing portrait of a card bearer and the second security image 130' could be a profile image of the card bearer. In at least some embodiments, the first security image 130 could be a visible portrait image of a card bearer and the second security image 130' could be the same portrait image of the card bearer, but printed in a non-visible ink (e.g., UV or IR ink) or an optically variable ink. Many different possible combinations are contemplated to be within the spirit and scope of the invention.

Referring again to FIGS. 3 and 4, the first surface 104 also can include other information, such as fixed information 19 (here, the name of the issuing authority) and variable/personal information, such as, a portrait 122, an address 16 and biometric information 18. Note that any or all of the variable/personal information could be part of the multiple image portion 120.

FIG. 5 is a top schematic view of the ID document of FIG. 3, viewed from a first angle, showing that only the first security image 130 is visible at the first angle. FIG. 6 is a top schematic view the ID document of FIG. 3, viewed from a second angle, showing that only the second security image 130' is visible at the second angle.

Referring again to FIG. 4, it can be seen that the information-bearing inner layer 106 is disposed beneath a light transmissive outer laminate layer 102 having lenticules 116a through 116n formed thereon. The lenticules 116 and laminate layer 102 together form a lenticular lens. At time, in this specification, "lenticule" and "lenticular lens" may be used interchangeably. The illustrative embodiment of FIG. 4 illustrates that the information bearing inner layer 106 is interposed between two light transmissive outer layers 102 and 114, but not all embodiments of the invention require that there be light transmissive outer layers affixed to both surfaces of the information bearing inner layer 106.

In at least one embodiment, the information bearing inner layer 106 corresponds to a core layer (also referred to as a substrate) of an identification document. In at least one embodiment, the information bearing inner layer 106 is made from a substantially opaque material, such as TESLIN. Other rigid or semi-rigid planar materials can, of course, be used. Further, it will be appreciated that the invention can be adapted to work with many other materials used as an information bearing layer 106, such as thermoplastic, polymer, copolymer, polycarbonate, fused polycarbonate, polyester, amorphous polyester, polyolefin, silicon-filled polyolefin, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone, and combinations thereof.

In the illustrated embodiment of FIG. 4, the two illustrated light-transmissive outer layers are adhered to the inner information-bearing layer 106 by two adhesive layers 110 and 112, respectively. The adhesives layers 110, 112 need not be provided separately, but could be already formed on the laminate layer 102. The first outer light-transmissive layer 102 is adhered to the inner information-bearing layer 106 by the first adhesive layer 110 and the second outer light transmissive layer 114 is adhered to the inner information-bearing layer 106 by the second adhesive layer 112. The outer layer 102 includes a series of parallel lenticular lenses 116a-116n (generally referred to as lenticular lens 116) which are formed as described below in conjunction with FIGS. 11-17.

In at least on embodiment, some of the 118a-118n includes variable/personal information and is provided on the surface 104 of inner information-bearing layer 106 that is used in cooperation with the lenticular lenses 116, to provide the multiple image optical effect. In at least one embodiment of the invention, the information 118 includes interlaced images that include a color portrait (the creation of such images is discussed further herein). The information 118 also could includes text or graphics that is representative of data desired to be displayed in the information bearing document, or any type of personal/variable data discussed herein. For example, textual data may include, but is not limited to, the name, address, state, or privileges of the holder of the document. Graphical data may include, but is not limited to, such items as a photographic image of the holder (in black and white, grayscale, or color) of the information bearing document, the seal of the state or corporation issuing the document, a trademark, or other security such as a complex geometric pattern.

One of ordinary skill in the art will appreciate that information 118 other than security images could be similarly provided on any surface on information-bearing inner layer 106 or outer layers 102 and 108. In addition, information could also be provided on either adhesive layer 110 and 112. Similarly, one of ordinary skill in the art will appreciate, in light of the teachings provided herein, that the information on certain of these surfaces would require the information to be printed using a reverse format. Further, one of skill in the art will appreciate that the information 118 could be distributed among a plurality of layers that lie beneath the lenticular lens layer 116. Thus, this disclosure is not intended to be limited to providing the information in a particular orientation or to a particular surface.

In addition, the information may be provided on the desired surface using any known techniques. For example, affixing the information could include any process in which a marking material is applied to a substrate to generate a permanent mark. Thus, one skilled in the art will appreciate that the invention can be adapted for color and/or black and white printing techniques, such as photogravure, flexographic and lithographic printing, printing by means of ink jet printers (using solid or liquid inks), phase change printers, laser printing, laser engraving and electro photographic printing. For example, laser engraved information could be provided on surface 104 of inner information-bearing layer 106 creating another level of security. Persons skilled in the printing art will appreciate that with some of these printing techniques, the "inks" used need not necessarily be conventional liquid inks but also could be solid phase change inks, solid colors, dyes, etc. This disclosure is intended to include any means of affixing the information to a particular desired surface.

The optimal dimensions of the lenticular lens formed by the laminate 102 and its lenticules 116a-116n for viewing the information 118 are at least in part dependent on and adapted to suit the thickness of the laminate layer 102, the thickness of the information printed 118, and the expected focal length with which the information 118 is to be viewed. For example, in an embodiment of the invention having a standard 30 mil thick identification card with D2T2 printing of variable information to a TESLIN core, which is to be viewed by a human at a distance of about one to two feet, the focal length is about 0.015 inches and depends on the distance between the edge of the lenticular lens and the information 118 printed on the core. In FIG. 4, the range of distances to consider is illustrated as "A" and "B" range from about 10 to 20 thousandths of an inch.

The number of lenticules 116 per inch ranges, in at least one embodiment of the invention, between about 45 to 100 lines per inch. As those skilled in the art will appreciate, the number of lenticules 116 required depends at least in part on the resultant size of the multiple image feature to be created, the number of images being interlaced to form it, and/or the desired "flipping" (e.g., gradual or quick) between and among the multiple images.

The lens 116 is preferably transparent at least where the underlying information 118 can be viewed. Underlying information 118 can be any information printed on the information bearing layer 106 or on any layers disposed between the information bearing layer 106 and the lens 116. Therefore, each document can be personalized for the cardholder. As is understood by those skilled in the art, the design of the lens 116 dictates the degree of rotation the ID card 100 needs for viewing the information. By rotating the ID card 100, the first and second security images 130, 130' appear to a viewer to appear and disappear.

In one embodiment, lens 16a is designed to require a rotation of the ID card 100 to order to view the underlying information. Rotating the ID card 100 causes the underlying information to seem to appear and disappear as viewed through the lens 116, as shown in FIGS. 5 and 6. As will be described herein, the technique of printing the interlaced image on the information bearing layer 106 (e.g., a core layer in an identification card) instead of on the lens (formed by the laminate layer 102 and lenticules 116), enables the interlaced image to be printed with variable color information, if desired.

The lenticules 116 of FIG. 4 can be achieved in several ways, including by embossing the laminate material 102 after it is laminated to the information bearing layer 106 (which is described more fully in FIGS. 11-17), and by using a purchased lenticular lens sheet, such as one provided by Orasee Corporation of Duluth, Ga. The lenticules 116 can be achieved with any optical thermoplastic material including but not limited to polycarbonate, polyester, polyurethane, cellulose acetates, polystyrenes, polyvinyl chloride, and polyethylene. In at least one embodiment, the embossing process does not induce any crystallinity or marring of the surface. Some polyester materials show low levels of crystallinity during the embossing process. Generally, this can be overcome by processing conditions, but if crystallinity ensues the optical properties could be sacrificed by the reduction in transmission. Advantageously, the outer layers 102 and 114 are substantially optically clear within the visible spectrum. A suitable material is an amorphous polyethylene terephthalate (also referred to as "PET") sheet 34, for example, the PET sheet sold by Transilwrap, of Franklin Park, Ill. under the trade name "TXP." In general, PET material has good strength and flexibility and has high anti-abrasion properties. Other suitable materials include like polyesters, which are the reaction products of the polymerization of ethylene glycols with polycarboxylic acids.

For adhesive layers 104 and 108, in at least one embodiment of the invention a usable adhesive material is an ethylene-vinyl acetate adhesive such as KRTY, which is the commercial trade designation for an adhesive available from Transilwrap. Other heat- or pressure-activated adhesive can of course be utilized, the selection thereof depending on the nature of the processes by which the inner-information bearing layer 106 is to be coupled to the outer protective layers 102 and 114. For a heat-activated adhesive, one can employ an ethylene ethyl acrylate copolymer of an ethylene ethyl acrylate or mixture thereof, as well as any of a number of polyolefinic hot melts.

Figure 7:
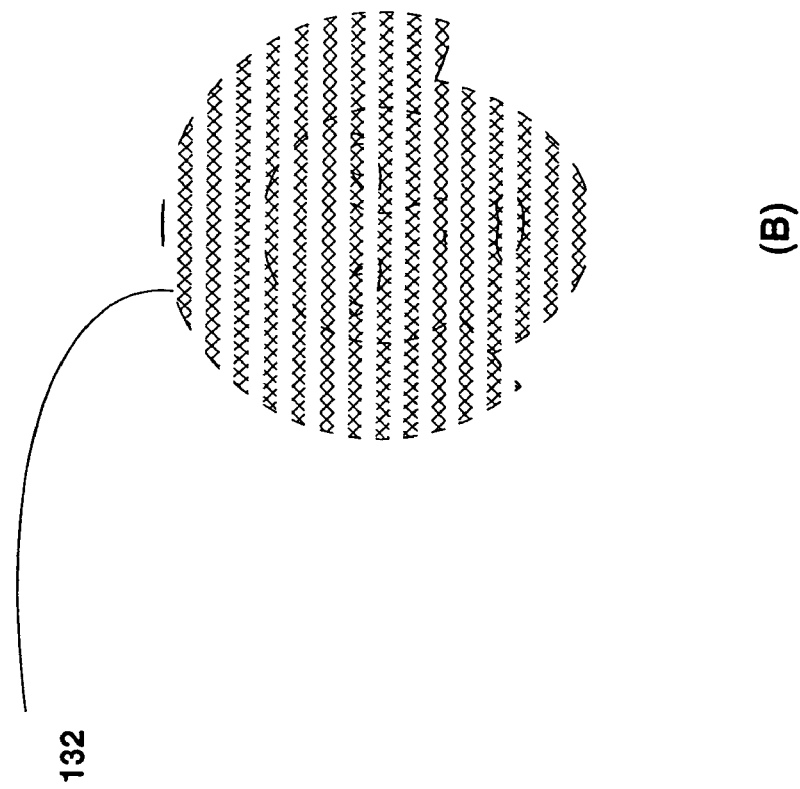
FIGS. 7A-B are illustrative examples of a first security image, in original and pre-interlaced form, respectively, relevant to the creation of a multiple image security feature shown in the ID document of FIG. 3.
Figure 7:
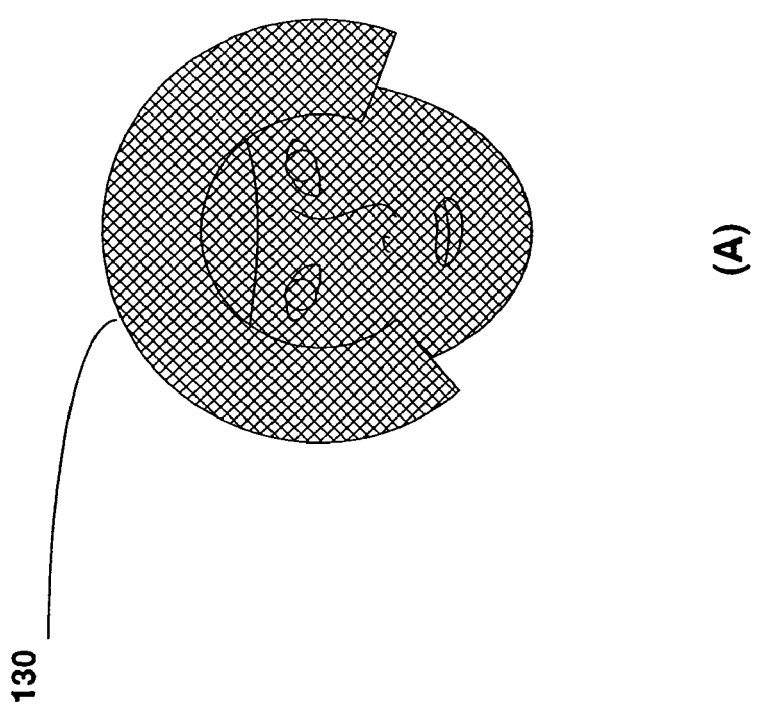

FIGS. 7A-B are illustrative examples of a first security image, in original and pre-interlaced form, respectively, relevant to the creation of a multiple image security feature shown in the ID document of FIG. 3. FIG. 7A shows a first security image 130 (the cross hatches shown are for illustrative purposes and do not necessarily represent what is shown in an image) before interlacing. FIG. 7B illustrates what is here termed a pre-interlaced first security image 132, representing the portion of first security image that is to be interlaced. The pre-interlaced first security image 132 is not necessarily an image that is separately created. Rather, the pre-interlaced first security image 132 represents one example showing the parts of the first security image 130 that could be used to create an interlace image that could be placed as information 118 on an ID card 100 that is viewable through the lenticules 116 affixed to the card (see FIGS. 3-6).

Figure 8:
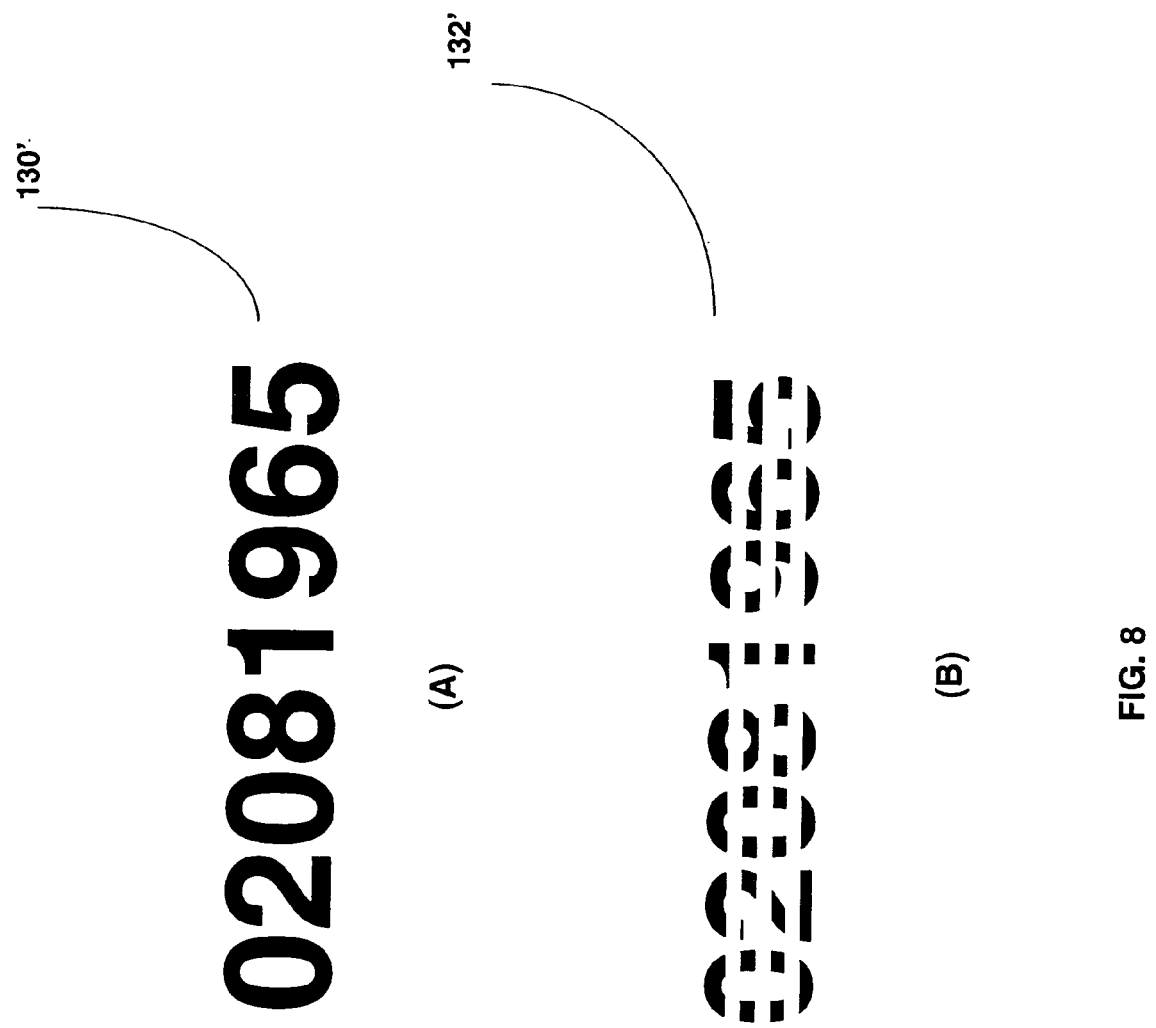
FIGS. 8A-8B are illustrative examples of a second security image, in original and pre-interlaced form, respectively, relevant to the creation of a multiple image security feature shown in the ID document of FIG. 3.

FIGS. 8A-8B are illustrative examples of a second security image 130', in original and pre-interlaced form, respectively, relevant to the creation of a multiple image security feature shown in the ID document of FIG. 3. FIG. 8B is similar to FIG. 7B in that it illustrated a pre-interlaced second security image 132', representing the portion of the second security image that is to be interlaced. The pre-interlaced second security image 132' is not necessarily an image that is separately created. Rather, the pre-interlaced second security image 132' represents one example showing the parts of the second security image 130' that could be used to create an interlace image that could be placed as information 118 on an ID card 100 that is viewable through the lenticules 116 affixed to the card (see FIGS. 3-6).

Figure 9:
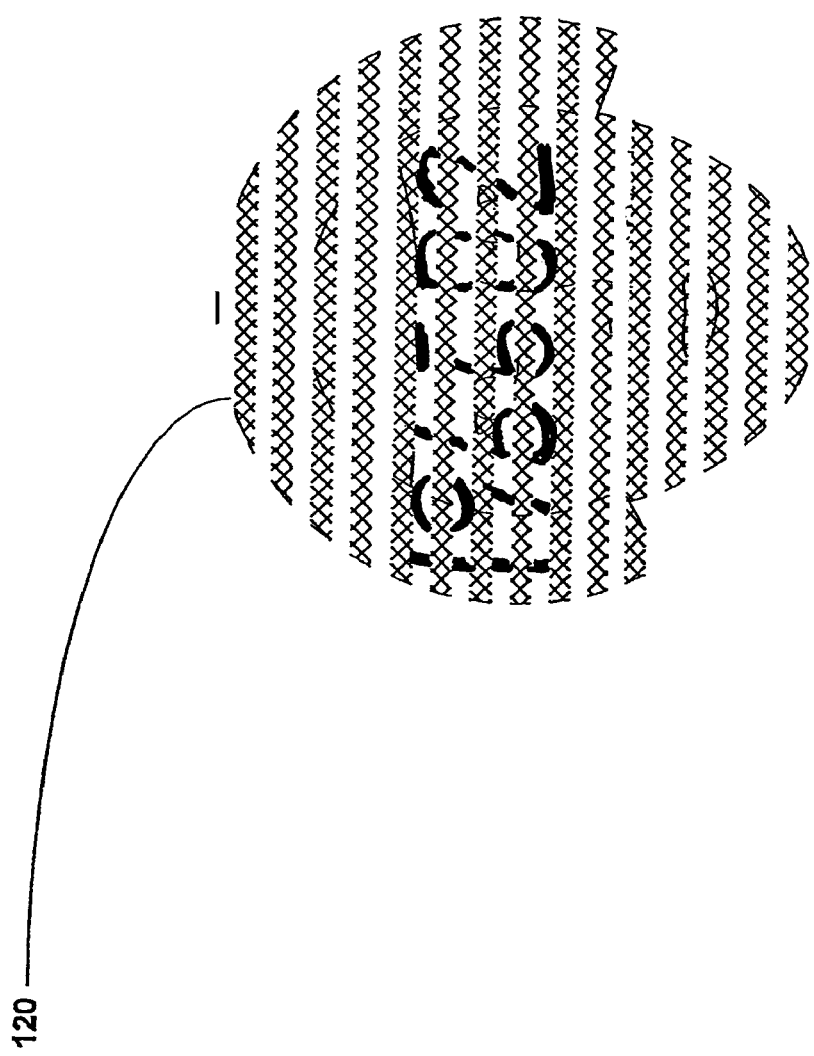
FIG. 9 is an illustrative example of a multiple image security feature created by interlacing the first and second security images of FIGS. 7A, 7B, 8A, and 8B, in accordance with one embodiment of the invention.
Figure 10:
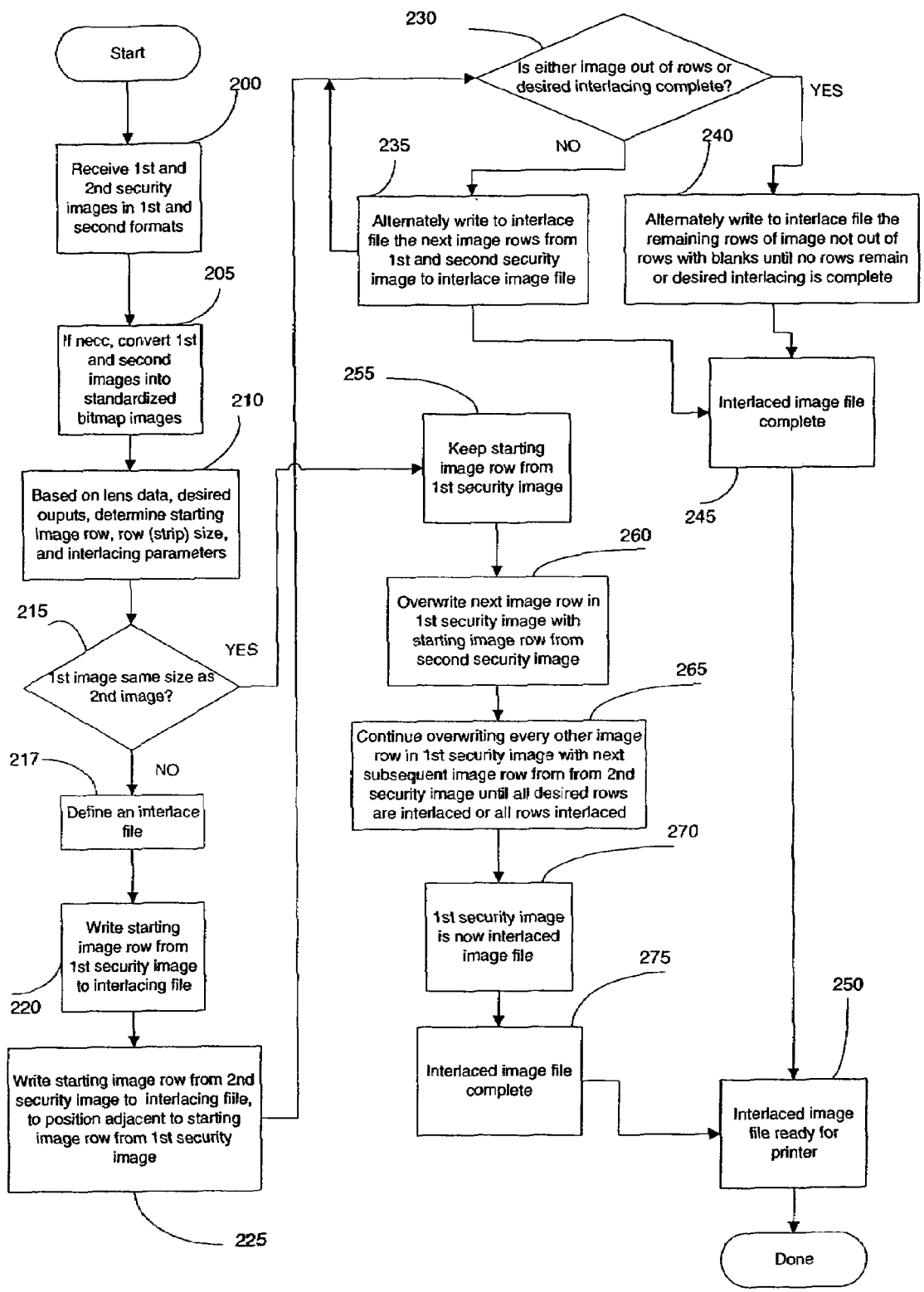
FIG. 10 is an illustrative flow chart showing a method for creating the multiple image security feature of FIG. 9, in accordance with one embodiment of the invention.

FIG. 9 is an illustrative example of a multiple image security feature created by interlacing the first and second security images of FIGS. 7A, 7B, 8A, and 8B, in accordance with one embodiment of the invention, in the manner contemplated by the flow chart of FIG. 10, which is now described.

FIG. 10 is an illustrative flow chart showing a method for creating the multiple image security feature 120 of FIG. 9, in accordance with one embodiment of the invention. Although this flow chart describes the process for creating a multiple image security feature 120 that is made from two security images, those skilled in the art will appreciate that this method readily can be adapted to interlace more than two images. In addition, although the term "security image" is used in this discussion by way of example, it is not limited to including just image type files, but also characters/strings.

In step 200, the desired first and second security images are received (step 200) for this process. The security image can be virtually any type of image or data. For example, in at least one embodiment, the security image is a string of one or more characters, such as a birthdate. The string can be in any font or color, and can include fixed and/or variable information. The string can be supplied in many ways, such as from a database, entered by hand, or extracted from a file.

In at least one embodiment, the security image is part of an image that was captured from a subject, such as a facial portrait, a fingerprint, or a signature. For example, in at least one embodiment, several pieces of such information about a subject can be stored in an object file that is usable as a security image input. In one embodiment, the method of FIG. 10 receives information in the form of a personal object file called a .poff file (formerly known as a POLAROID object file). The following provide some further information about the .poff file format used in accordance with at least some embodiments of the invention.

POFF Files

This file format is designed to encapsulate all the data needed to process an individual ID card. All the data needed to print and handle the card will be included in the file. This permits this file to be shipped as an entity across a network where it can be printed, displayed or verified without need for additional information. The specific fields and their order in text area are not specified, there is a provision for a separate block of labels for the fields for display purposes. The format is suitable for encoding on 'smart cards' as well as transmission and printing of the records.

The image file formats were chosen for their compatibility with the AAMVA standards and for their widespread acceptance as file formats in popular applications and libraries.

AAMVA (American Association of Motor Vehicle Administrators) has begun work on a transmission standard for Image/Text data and is revising its best practices guide for image storage format. The AAMVA baseline standard for signatures is currently 8 bit grayscale (JPEG compressed), the standard also supports bi-level with CCITT group 3 or 4 as an accepted alternate. It needs to be determined with of these formats is preferred by the marketplace.

Typical US DMV files contain the following blocks:
Text Block (tag 0x0001)
JPG Portrait Block (tag 0x0011 or tag 0x0211)
ID-3000 or TIF Signature Block (tag 0x0420 or 0x0520)
They may optionally include fingerprint blocks

| File Format | |
|---|---|
| Header | |
| POFF | 4 byte literal |
| Version | 2 byte unsigned integer |
| | (high byte major version low byte minor version) |
| Object Count | 2 byte unsigned integer |
| File Length | 4 byte unsigned integer |
| Directory Area | |
| Directory Checksum | 4 byte unsigned integer |
| Object Type Tag | 2 byte unsigned integer [Beginning of directory] |
| Length of Object | 4 byte unsigned integer |
| Offset of Object | 4 byte unsigned integer [from beginning of file] |
| ... | additional directory entries |
| End of Directory Tag | |
| Data Area | |
| Object Type Tag | 2 bytes [Included in length of object] |
| Object Checksum | 4 bytes |
| Object Data | |
| ... | additional data sections |

Checksums are the 32 bit unsigned integer sums of all the bytes in the checksum range, for data sections the checksum range is all the bytes that follow the checksum until the next object tag, for the directory area the checksum range is all the individual directory entries (the length should be 6 times the object count). The length in the header is the length of the original data object (it does not include the tag an the checksum).

Standard DMV File Layout
Header
Directory
Text Data
Portrait
Signature
Data Formats
All numeric values are in Intel x86 format (byte order)
Color Images
Primary Format
 .JPG (JPEG File Interchange Format)
Alternate Formats
 .TIF (JPEG Compressed TIFF)
 ID-3000 Version 2.2+ Compatible format with marker codes
B+W Images
.PCX (CCITT Group 3 or 4 Compatible Modes)
.JPG (8 bit grayscale JFIF compressed)
.TIF (Any B&W or Grayscale TIFF 6 Compatible File Format)
Text Data (or Labels)
.CSV (comma separated value)
A comma as data is represented by ESC, or by single quoting field
Two commas together indicates a blank field
All other characters must be printable ASCII Text (32-126, 128-254)

| Data Tags (16 Bit Unsigned Integer) | | |
|---|---|---|
| Text | 0x0001 | |
| Text Field Labels | 0x0002 | |
| Double Byte Text | 0x0101 (for use with Asian character sets) | |
| Double Byte Labels | 0x0102 (for use with Asian character sets) | |
| Front Portrait | 0x0011 | JFIF (JPG File format) |
| Left View Portrait | 0x0012 | JFIF (JPG File format) |
| Right View Portrait | 0x0013 | JFIF (JPG File format) |
| Front Portrait | 0x0111 | TIFF |
| Left View Portrait | 0x0112 | TIFF |
| Right View Portrait | 0x0113 | TIFF |
| Front Portrait | 0x0211 | ID-3000 |
| Left View Portrait | 0x0212 | ID-3000 |
| Right View Portrait | 0x0213 | ID-3000 |
| Signature | 0x0020 | Bi-Level PCX (group 3 or 4) |
| Signature | 0x0120 | Grayscale (JFIF Compressed) |
| Signature | 0x0220 | Grayscale (JTIF Compressed) |
| Signature | 0x0320 | ID-3000 Grayscale |
| Signature | 0x0420 | ID-3000 Binary |
| Signature | 0x0520 | TIFF (any TIFF 6.0 type) |
| Bitmap Fingerprint Data | | |
| Right Thumb | 0x0030 | |
| Right Index Finger | 0x0031 | |
| Right Middle Finger | 0x0032 | |
| Right Ring Finger | 0x0033 | |
| Right Little Finger | 0x0034 | |
| Left Thumb | 0x0038 | |
| Left Index Finger | 0x0039 | |
| Left Middle Finger | 0x003A | |
| Left Ring Finger | 0x003B | |
| Left Little Finger | 0x003C | |
| Minutiae Fingerprint Data | | |
| Right Thumb | 0x0130 | |
| Right Index Finger | 0x0131 | |
| Right Middle Finger | 0x0132 | |
| Right Ring Finger | 0x0133 | |
| Right Little Finger | 0x0134 | |
| Left Thumb | 0x0138 | |
| Left Index Finger | 0x0139 | |
| Left Middle Finger | 0x013A | |
| Left Ring Finger | 0x013B | |
| Left Little Finger | 0x013C | |
| Digital Signature Tags | | |
| CRC Method | 0x0040 | |
| Polaroid Bingo Method | 0x0041 | |
| DataStream Tags | | |
| PDF-417 Barcode Data | 0x0050 | |
| End of Directory | 0x00FF | |
| User Definable Tags | 0xFFxx (where xx is 0x00-0xFF) | |

-continued

The Tag Pattern 0x0Fxx is reserved for special operations.

Notes on Tag Types

The Digital signature tags are for improved file security. The system is a compromise between encrypting the actual data elements, and leaving the data unsecured. A Digital signature object contains a Digital Signature structure (defined elsewhere) that includes information about the specific object it protects. The original object is unchanged by the method, an application which wishes to validate the authenticity of an object builds the signature for the object and compares it to the value stored in the field.

The Data stream tags are used to represent data that is passed into the system for special purpose processing. They are used when the higher levels of the system do no have the ability to make sense of the data contained. An specific example of this would be when encrypted data is being passed in the system for printing as a barcode.

Now referring again to FIG. 10, virtually any type of pairing of different (or similar) types of files are possible with the pair of first and second security images. For example, in one embodiment, the first and second security images comprise a string (e.g., characters representing date of birth) and part of a personal object file, such as a portrait image. In one embodiment, the first and second security images comprise a pair of personal object file data, such as a portrait and a signature. In at least one embodiment, the first and second security images comprise a personal object file data (e.g., a fingerprint image) and a standalone image, which could be a supplied image (e.g., a state seal or logo). Any of the information (strings, object files, images) can be fixed or variable, and those skilled in the art will appreciate that different types of cards will have differing security needs and, thus, may require different types of pairs of images.

Referring again to FIG. 10, if the first and second security images are not already in a predetermined standard size and bitmap form, the first and second security images are converted (step 205) to bitmap type files of a standard size. The size is dependent on the desired physical size of the multiple image feature on the card. In one embodiment, a software product usable to accomplish the conversion into a standard bitmapped image is the LEAD TOOLS 12.0 FOR WINDOWS 32 product available from Lead Technology, Inc., of Charlotte, N.C.

In step 210, an image row in the image is selected as a starting point to begin the interlacing. The image row can comprise of, for example a single row of pixels or can, for example, be multiple rows of pixels. The size of the image row depends on various factors, such as the design of the lens (e.g., lens dimensions), lens features (e.g., lenticules per inch), the size of the first security image, the size of the second security image, the degree of switching (fast or slow) between images that is desired, focal length, and surface quality.

For example, assume that a lenticular lens formed on the laminate 102 (FIG. 3) has about 90 lenticules (also referred to as "lines") per inch ("lpi"). It is assumed, for the purposes of this example, that the lenticules are oriented so that they are horizontally aligned over a security image, although such an orientation is not limiting. In this same embodiment, the first security image may have a size of 450 pixels long by 450 pixels wide, with each pixel (assume square pixels) being about 0.0011 inches along in length along each side—an image about a half inch long and a half inch wide. For an image with those dimensions and a lenticular lens formed in laminate 102 having 90 lenticules per inch (or 45 lenticules per half inch), there will be a lenticule about every 0.011 inches, or about every 10 pixels. Thus, one type of interlacing for the security image is to alternate every 10 pixels (e.g., 10 pixels "on" in the image, 10 pixels "off" for a first security image, and the reverse for the second security image). The inventors have determined, however, that the optimum interlacing for the security images used in ID documents is a 5 pixel on, 5 pixel off configuration. Referring again to step 210 of FIG. 10, the so-called row size would, in this example, be 10 pixels.

To determine a starting image row (that is, the row in the image where the method begins will begin the "on-off" interlacing, the method of FIG. 10 uses a one or more predetermined input parameters. In one embodiment, a user may have a choice, for example, of setting the interlacing to begin at the top of an image and work down, at the bottom and work up, somewhere in between and work up or down. This is, in one embodiment, a fixed parameter for all identification documents being manufactured in a given "batch" for example.

It is anticipated that the invention can be adapted to be able to determine the starting image row dynamically, based on the type and/or size of the first and/or second security images. For example, assume that the first security image is a full color image portrait having a first size and the second security image is a text string that can vary from user to user (e.g., an address) and thus may have a different "height" for different users (assuming that the text string could "wrap around" to fill the available image space. The method of FIG. 10 and particularly step 210 can be adapted to select a starting row for interlacing depending on the "height" of the second security image, to best provide a substantially complete interlacing between the first and second security images. Note also that varying the starting row can cause the image flip angle (or the viewable angle) to change.

Although not specifically addressed in the exampled discussed in connection with FIG. 10, step 210 of FIG. 10 also takes into account parameters such as desired size of resultant final interlaced image and desired fonts and font colors of any characters printed as part of final interlaced image. The font colors can include single colors, multiple colors, rainbows of colors, pearlescent colors, full colors, and the like, as desired.

In step 215 of FIG. 10, if the first and second images are the same size, the processing moves to step 230 (discussed below). Note that, in at least one embodiment, two images being the same "size" implies that the two images have the same height and width (in pixels). In this embodiment, if the first and second security images are not the same size, the interlaced image is created in a different file, but if the first and second images are the same size, the interlaced image is created by directly interlacing into one of the images (for purposes of example, we assume that image to be the first security image, but using the second works equally well). Generally, for images of unequal size, the smaller image is interlaced into the larger image.

If the first and second security images are different sized, an interlace file is defined (step 217) and the interlaced data is written to it from the first and second security images. The interlace file has a bitmap format. This begins by writing the desired starting image row from the first security image to the interlace file (step 220). For example, if the first security image corresponded to the 450 by 450 example described above, the starting image row could be the first 10 rows of pixels in the first security image. Next, the desired starting image row (also, in this example, 10 rows of pixels) is written from the second security image (step 225). In one embodiment, this row is written in the interlace file to position directly adjacent to the row just written from the first security image. As shown in steps 225, 230, and 235 this process is alternated back and forth from the first to the second security image until the desired amount of interlacing is complete or one of the images "runs out" of rows of pixels. Note that the method of FIG. 10 can be adapted so that only partial interlacing (e.g., interlacing for, say, 40 lenticules worth of image) is required, so the process of steps 225 through 235 can stop when the desired amount of interlacing is desired.

If one of the images is out of rows, the rows in the other image continue to be written to the interlace file, alternating with rows of "blanks", until there are either no rows of the image left or the desired interlacing is complete (step 240). In this embodiment, by "blank" it is meant that the other image will be overwritten with what ever background color (e.g., white, but need not be white) that the information bearing layer 106 is. The interlaced image file is then complete (step 245) and ready to be provided to a printer for printing on a card (step 250). In at least one embodiment, the resultant interlaced image file resembles the file shown in FIG. 9.

Referring again to step 215, if the first and second security images are the same size, it is not required to create a new interlaced image file (although in at least one embodiment it is contemplated that a new interlaced image file nonetheless can be created in a manner similar to that described in steps 217 through 250). Rather, one of the security images can be "turned into" an interlaced image file via steps 255 through 250. For purposes of example only, it is assumed here that the first security image is to be "turned into" the interlaced image file.

The starting image row in the first security image is retained (step 255) (note that starting image row and subsequent image rows are the same as defined above). The next image row in the first security image is overwritten with the starting image row from the second security image (step 260). This process continues (alternately overwriting the image rows in the first security image) until the desired degree of interlacing is achieved or all rows are interlaced (step 265). The resultant interlaced image will have a similar general appearance to the image of FIG. 9, but will show interlacing of two similarly sized images. As a result of steps 255 through 265, the first security image file has been converted to an interlaced image file (steps 270 and 275) and is ready to be printed on the substrate.

It will be appreciated by those of ordinary skill in the art that several print technologies including but not limited to indigo (variable offset) laser xerography (variable printing), offset printing (fixed printing) and inkjet (variable printing) can be used to print the information 118 (which can include the above mentioned interlaced image file) on the inner information-bearing layer 106. The information can be printed using dots or lines of varying colors to form text or images. The information also can comprise process colors or pantone colors. The multiple image features can include personal information in a color format.

Figure 11:
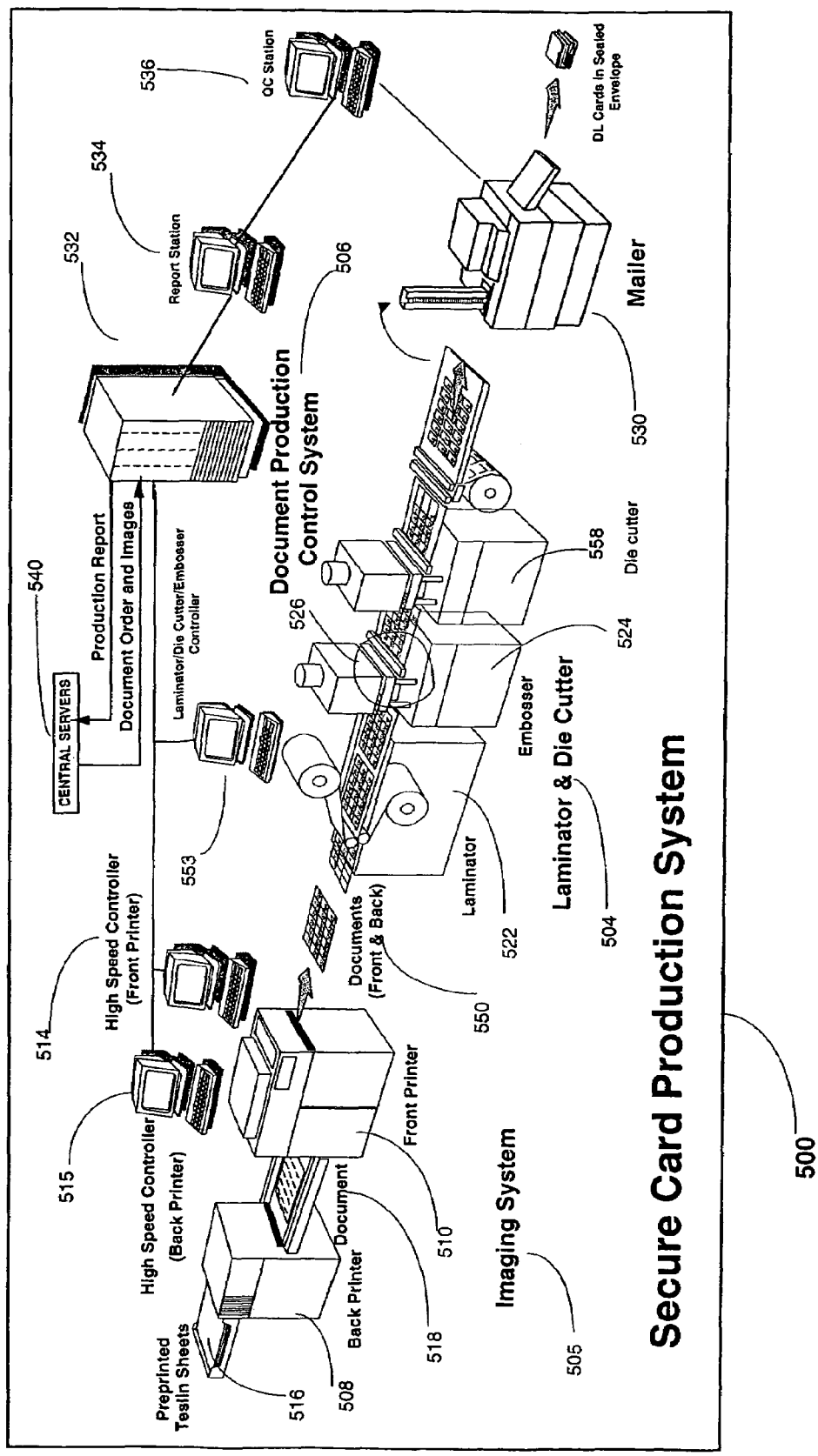
FIG. 11 is an illustrative diagram of a first central issue card production system that can be used to produce the ID document of FIG. 3, in accordance with one embodiment of the invention.

In one embodiment of the invention, the ID card 100 of FIG. 3 can be produced in a high volume central issue environment. FIG. 11 is an illustrative diagram of a first central issue card production system 500 that can be used to produce the ID document of FIG. 3, in accordance with one embodiment of the invention. The system 500 includes an imaging system 505, laminator and die cutter system 504, and a document production and control system 506.

The imaging system includes a back printer 508 for printing the back side of the card and a front printer 510 for printing the front side of the card. Each printer has its own high speed controller 514, 515. The laminate and die cutter system 504 includes a laminator 522, an embosser 524, a die cutter 558, and a laminator/die cutter/embosser controller 553. In one embodiment, the laminator/die cutter/embosser controller helps to implement the method of FIG. 10.

The document production control system includes central servers 540, a report station 534, a quality control station 536, and a mailer 530. The QC Station 536 and its associated bar code scanner (not shown) can be used by an operator to scan the bar code of a defective sheet or document. Keyboard entry can also be used to report or to check documents and sheets.

Production of the ID document begins at the Imaging System 505, where card substrates, such as preprinted TESLIN sheets 516, are fed into the back printer 508. The back sides of the TESLIN sheets 516 can be customized with desired information (e.g., restriction codes or other information unique to each document on the sheet). In addition, bar codes for tracking the documents through the production process can be added. As the TESLIN sheet enters the second section of the Imaging System 505, the front printer 510 prints appropriate portrait and signature images on the front of the documents based on personalized cardholder information stored in a file. The front printer 510 also prints the interlaced images (which, in one embodiment, comes from an interlaced image file accessible to the laminator/die cutter/embosser controller 553) on the front of the TESLIN sheets 516. Note that since a plurality of ID documents are being produced simultaneously, the front printer 510 can print an interlaced image file for each document onto the appropriate locations of the TESLIN sheets 516. The output of the front printer 510 are document sheets 550 printed on the front and back.

As completed sheets accumulate in the output hopper of the Imaging System 505, in one embodiment, an operator performs a visual inspection and transfers the completed sheets to the input hopper of the Laminating/Embossing/Die-Cutting System 504. Any sheets failing visual inspection can be brought to the QC station 536 where their bar code is scanned and production of a replacement automatically ordered. The failed sheets are then destroyed.

When the document sheets 550 are about to enter the Laminating/Embossing/Die-Cutting System 504, automatic scanners confirm that the front and back sheets 550 match, that sheets 550 have not stuck together, and that the sheets 550 are right side up. After the scanning process, the laminator 522 applies the desired laminate material (e.g., polyester) on both sides (front and back) material to all sheets to form a continuous web of laminated sheets. The embosser 524 then embosses the laminate to form the lenticules 116 (FIG. 3). In at least one embodiment, registration marks printed on one or both sides of the sheets 550 help to precisely orient the embosser 524 so that the lenticular lens feature is correctly formed on the interlaced images 120 printed on the sheets 550. More details about the embosser 524 are provided below.

Figure 12:
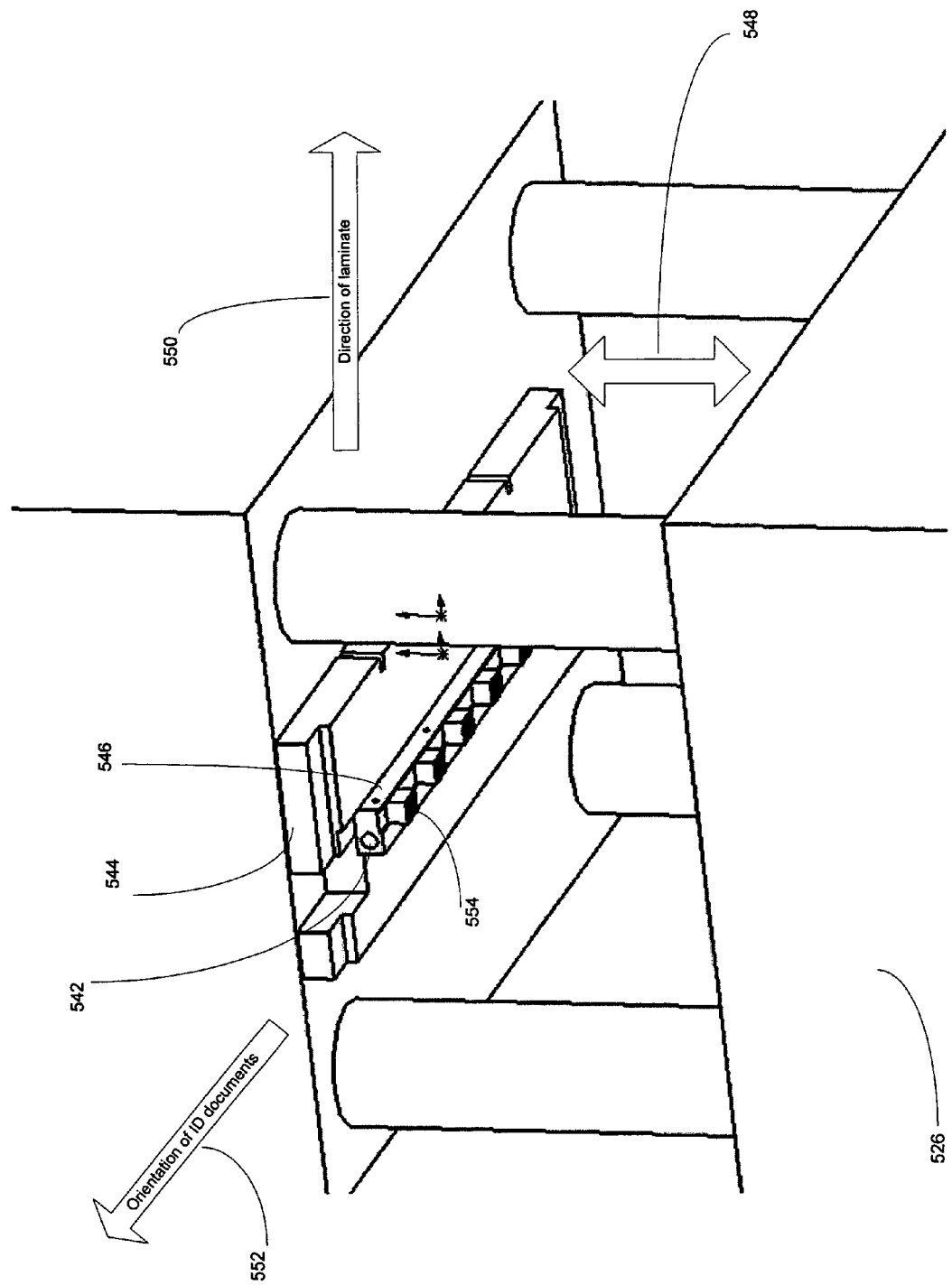
FIG. 12 is a detailed view of a portion of the embosser of FIG. 11.

The web of laminated sheets leaves the embosser then passes into the die cutter 558, which cuts the sheet into individual documents. After the ID documents are produced and given a final quality control inspection, they are fed into the mailer 530. The mailer prints the applicant's address on the card holder and inserts the ID document into the holder. The holder is then inserted into an envelope for mailing FIG. 12 is a detailed view of the section 526 of the embosser 524 of FIG. 11. This detailed view shows that an embosser in accordance with one embodiment of the invention includes a plurality of lenticular dies 554, an insulator plate 544, and a heater bar 542 in the insulator plate. The heater bar 542 in the insulator plate helps to keep the die 554 laminate at a temperature suitable for the deformation necessary to produce lenticules during embossing.

Although not visible in FIG. 12, the embosser 524 is capable of up and down motion 548 to accomplish the embossing process (the techniques for doing this are not described here and assumed to be within the abilities of one skilled in the art). Various parameters, such as time, temperature, pressure, stroke of the press and die design, can be adapted to optimize the operation of embosser 524 for a given ID document, laminate, and lenticule size. For example, in one embodiment, when using polycarbonate materials, the embosser 524 uses a temperature of 425 degrees Fahrenheit for 5 seconds at a pressure of 20 PSIG (lb/in2 on the gauge) is used. When using a PET material a temperature of 275 degrees Fahrenheit for 5 seconds and a pressure of 20 PSIG is used. The stroke of the press is set so that the die 554 only enters the surface of the laminate so as to emboss the lenticules. If the stroke is too large then the card deformation will be excessive. Stroke time and temperature are interrelated because of a minimum amount of heat is required to form the lenses 116. The higher the die 218 temperature the lower the time required to form the lens and vice versa. Pressure and stroke of the press 216 are adjusted to minimize card deformation. Deformation can occur throughout the ID card 100 thickness and show on the back of the card or at the edges of the card. By optimizing these adjustments, these effects are reduced to make an acceptable ID card 100.

The plurality of lenticular dies 554 enable the embossing of a corresponding plurality of ID documents that pass through in the ID document orientation direction 552. Specifically, each lenticular die 554 is capable of creating a plurality of lenticules on the laminate that covers each interlaced image printed on respective ID document. In the embodiment shown in FIG. 12, there are 7 lenticular dies 554 that can substantially simultaneously emboss 7 different ID documents that are part of the printed sheets 550. It will be appreciated, however, that the laminator 524 of FIGS. 11 and 12 also could be adapted to emboss a single ID document at a time (e.g., with no subsequent die cutting), or to emboss documents passed through in a form other than sheets to be die cut, such as a 1 by n web (where n is the number of ID documents) passing through the embosser 524.

FIGS. 13A-D are illustrative top, cross-sectional, enlarged, and isometric views, respectively, of the lenticular die 554 of the embosser of FIG. 11. The lenticular die 554 can be formed from many different materials, including metals, ceramics, composites, and the like.

The quality of the surface of die 554 can have a significant impact on the quality and "on off" effect of the lenticules that it forms. For instance, if a rough surface is generated from the manufacturing process of the embossing die 554, the rough surface could be transferred to the lenticular lens 116 and the functionality could suffer, accordingly. Note also that various machining processes can be used do create different depths of the sinusoidal patterns of the die 554 shown in FIG. 13(c). In one embodiment, an electrical discharge machining (EDM) processes are used make the die 218 having a surface roughness of #16 or better.

In one embodiment, the resultant lenticules formed by the die 554 can be improved by electroplating the die 554 with various materials such as TEFLON, Polyond, Ni-plating, Cu plating or Cr-plating. As those skilled in the art will appreciate, the plating depends on the die material and the compatibility of the plating material.

Figure 13:
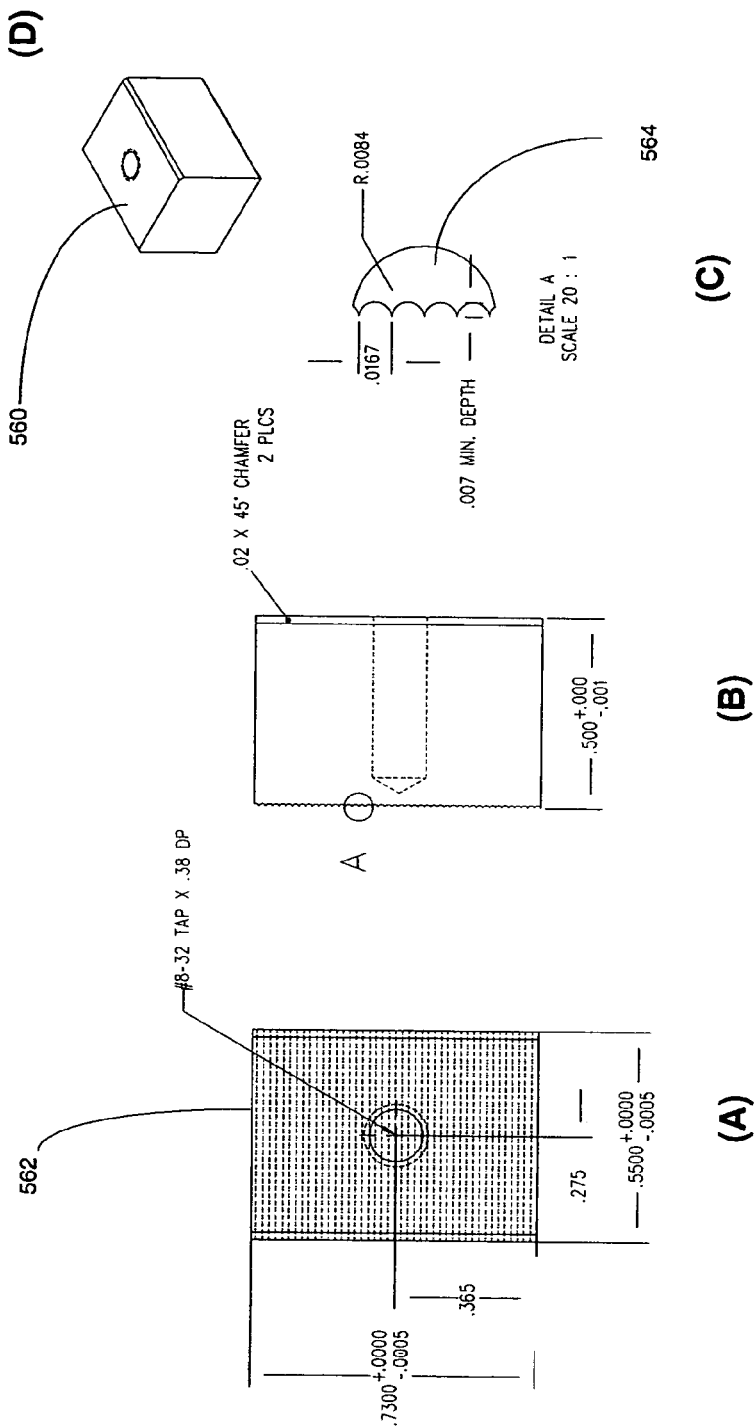
FIGS. 13A-D are front, cross-sectional, enlarged, and perspective views, respectively of the lenticular die of the embosser of FIG. 11.
Figure 14:
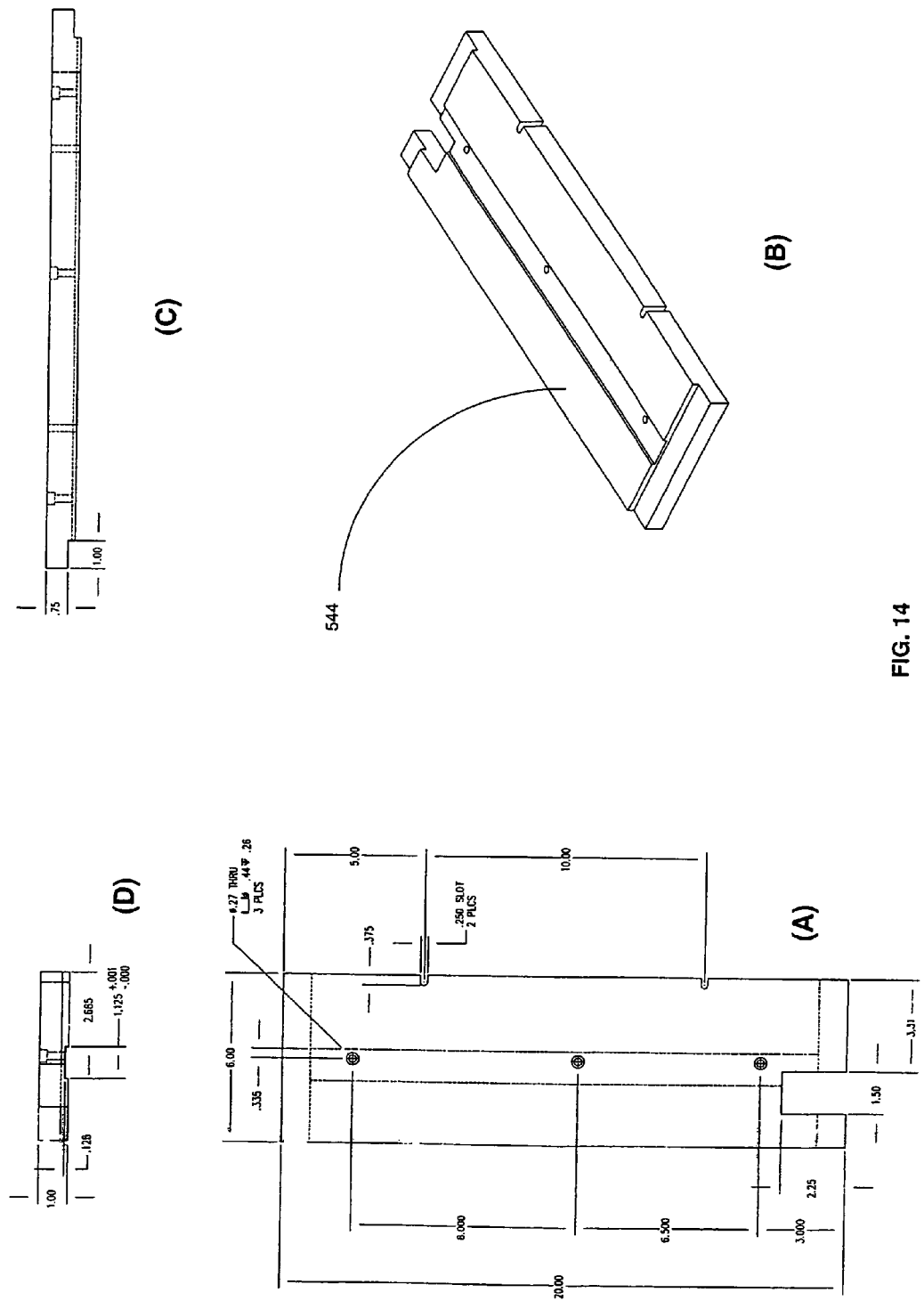
FIGS. 14A-D are cross-sectional, perspective, side, and edge views, respectively, of the insulator plate of the embosser of FIG. 11.
Figure 15:
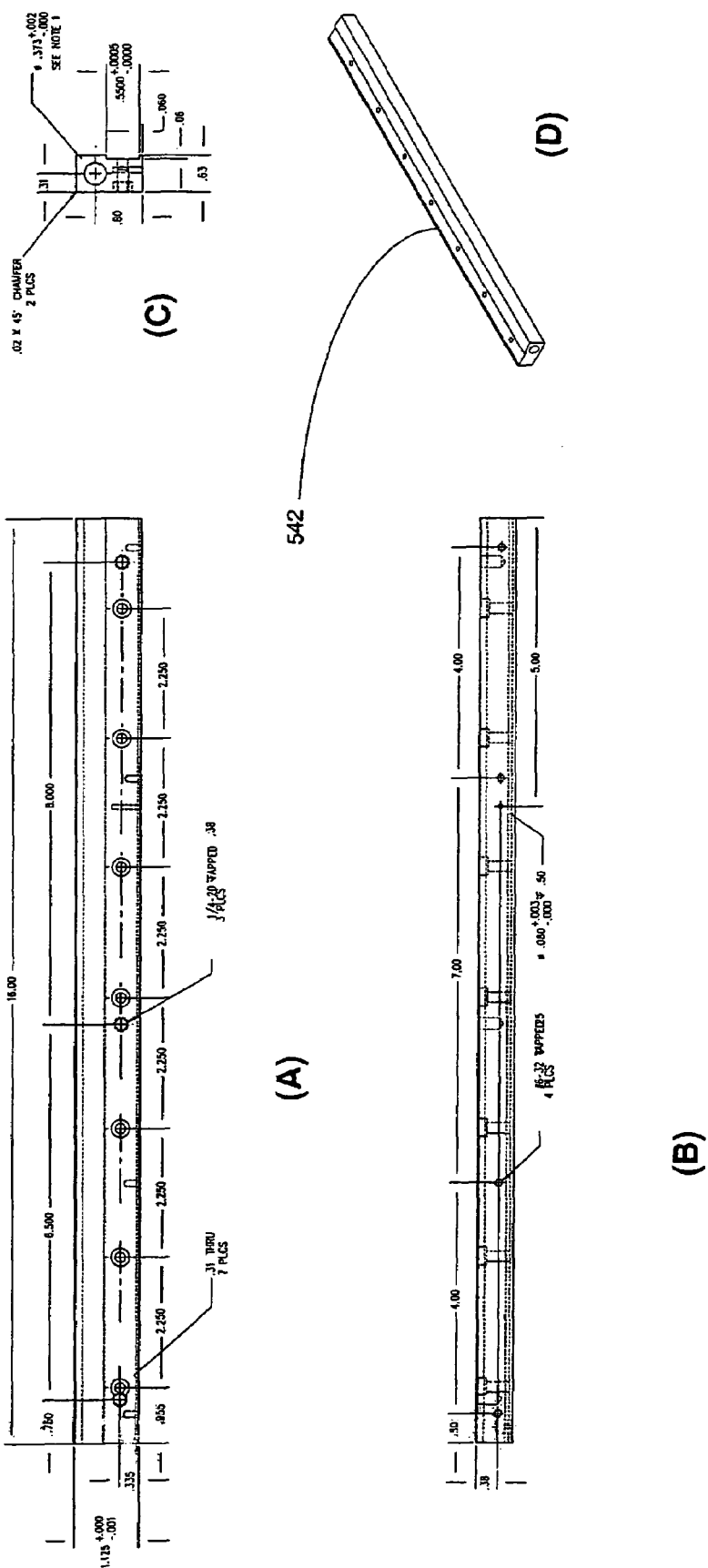
FIGS. 15A-D are top, cross-sectional, edge, and perspective views, respectively, of the heater bar of the insulator plate of FIGS. 14A-D and FIG. 11.

In one embodiment the die 554 can be plated then coated over the plating with a polytetrafluoroethylene coating to reduce the adhesion of the die 554 to the laminate. Referring to FIGS. 3 and 13, the upper light-transmissive outer layers 102 material might require some mold release agents to prevent the die 218 from sticking to the ID card 100 after the embossing process. When the die 554, begins to ascend from the ID card 100 surface, the die 554 can adhere to the ID card 100, the ID card 100 and lens 116 will deform and produce a poor product. The level of mold release is a factor in formulating a material that would optimize this process. Exterior mold release agents can be used in conjunction with internal mold releases to improve the process. The type of exterior mold release will also have an effect.

For purposes of further illustration, FIGS. 14A-D are cross-sectional, perspective, side, and edge views, respectively, of the insulator plate of the embosser of FIG. 11, and FIGS. 15A-D are top, cross-sectional, edge, and perspective views, respectively, of the heater bar of the insulator plate of FIGS. 14A-D and FIG. 11. The insulator plate and heater bar can be formed of any suitable materials, including mild steel (CRS), glastherm, and high temperature insulating material.

Figure 16:
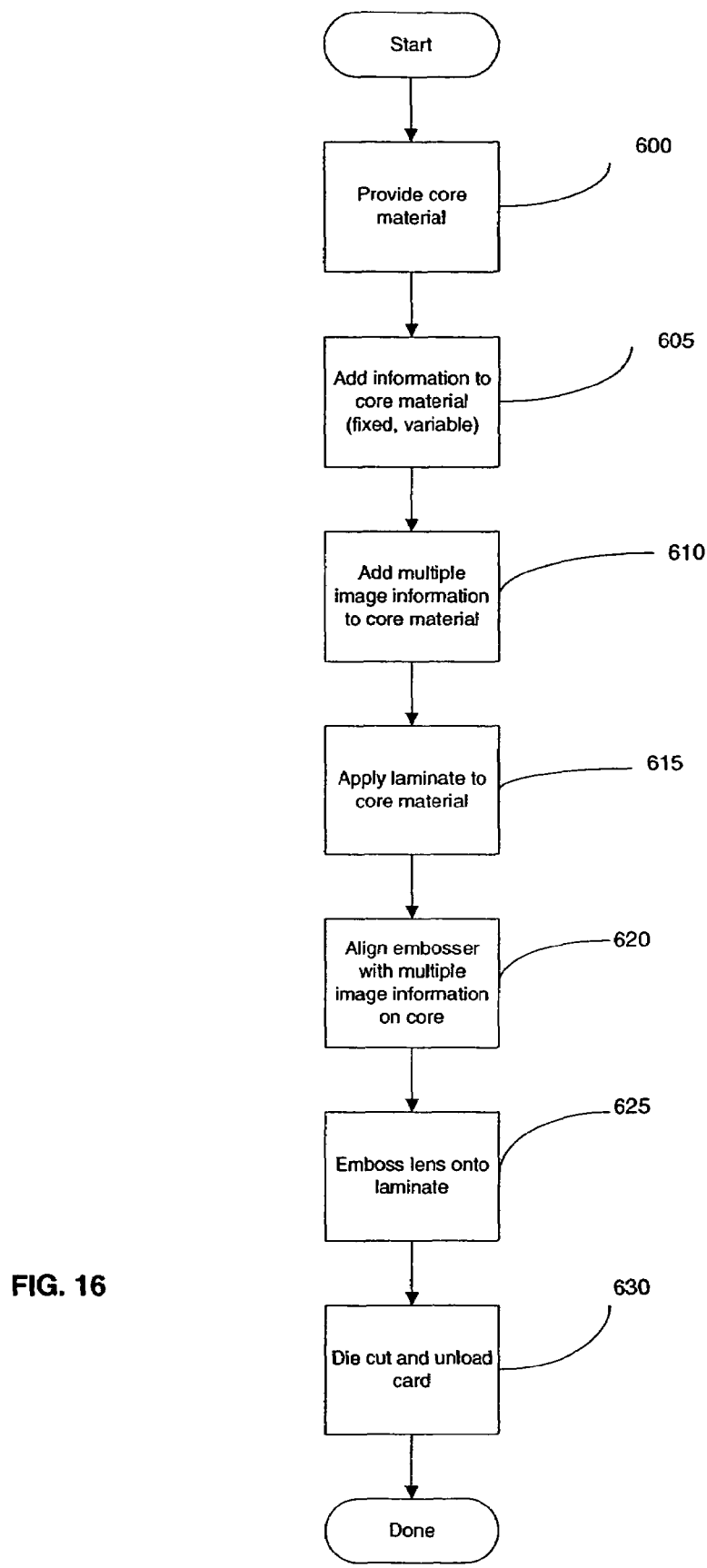
FIG. 16 is a flow chart of a first method for manufacturing the ID document of FIG. 3 using the system of FIG. 11, in accordance with one embodiment of the invention.

FIG. 16 is a flow chart of a first method for manufacturing the ID document of FIG. 3 using the system of FIG. 11, in accordance with one embodiment of the invention. The detailed description of these method steps already has been done in connection with the description accompanying FIGS. 3, 10, 11, 12 and 13, and is not repeated here.

The above described embodiments were provided to illustrate one aspect of the invention, in which a multiple imaged ID document having a lenticular lens feature can be manufactured by laminating the ID document then embossing a lenticular lens into the laminate. It should be understood, however, that the invention is not limited solely to forming a lenticular lens after lamination in the above-described manner. Those skilled in the art will appreciate that lenticules can be formed after lamination in many different ways. For example, in at least some embodiments of the invention the lenticules 116 of the identification documents described herein can be created by physically removing some of the laminate to achieve the desired shape, such as by etching, engraving, milling, scratching, stamping, abrading, bending, filing, cutting, inscribing, and the like. The removal of the laminate can be done using any known tooling, through chemical processes (e.g., chemical etching) or by a laser. It also is contemplated that in at least some embodiments of the invention, a mold could be used to form the laminate into lenticules as the laminate is applied to the information bearing layer 106.

It is unclear at the time of filing whether roll laminates containing an extrusion formed lens or laminate with previously formed lenses and respective registration marks for later lamination processes to form ID documents are available. However, the invention proposes a method to make such a roll laminate, below.

In another aspect of the invention, the formation of lenticules 116 on the laminate 102 occurs prior to the laminating of the laminate to the information bearing layer 106. For example, embossing of the laminate 102 with lenticules can occur prior to lamination. In one embodiment, a multiple imaged ID document can be formed by using sheets of laminate having lenticular lenses already formed thereon. A separate process step can be used to form the lenticular lenses on the laminate. This embodiment of the invention can be achieved using a system similar to the system shown in FIG. 11. Instead of providing an embosser 524, however, a system of this aspect provides a roll of laminate material that includes lenticular lenses formed thereon. Advantageously, the laminate having lenticular lenses formed thereon also includes registration marks within the laminate, to assist in accurately registering the lenticular lens to the interlaced image as the laminate is laminated to the image.

Figure 17:
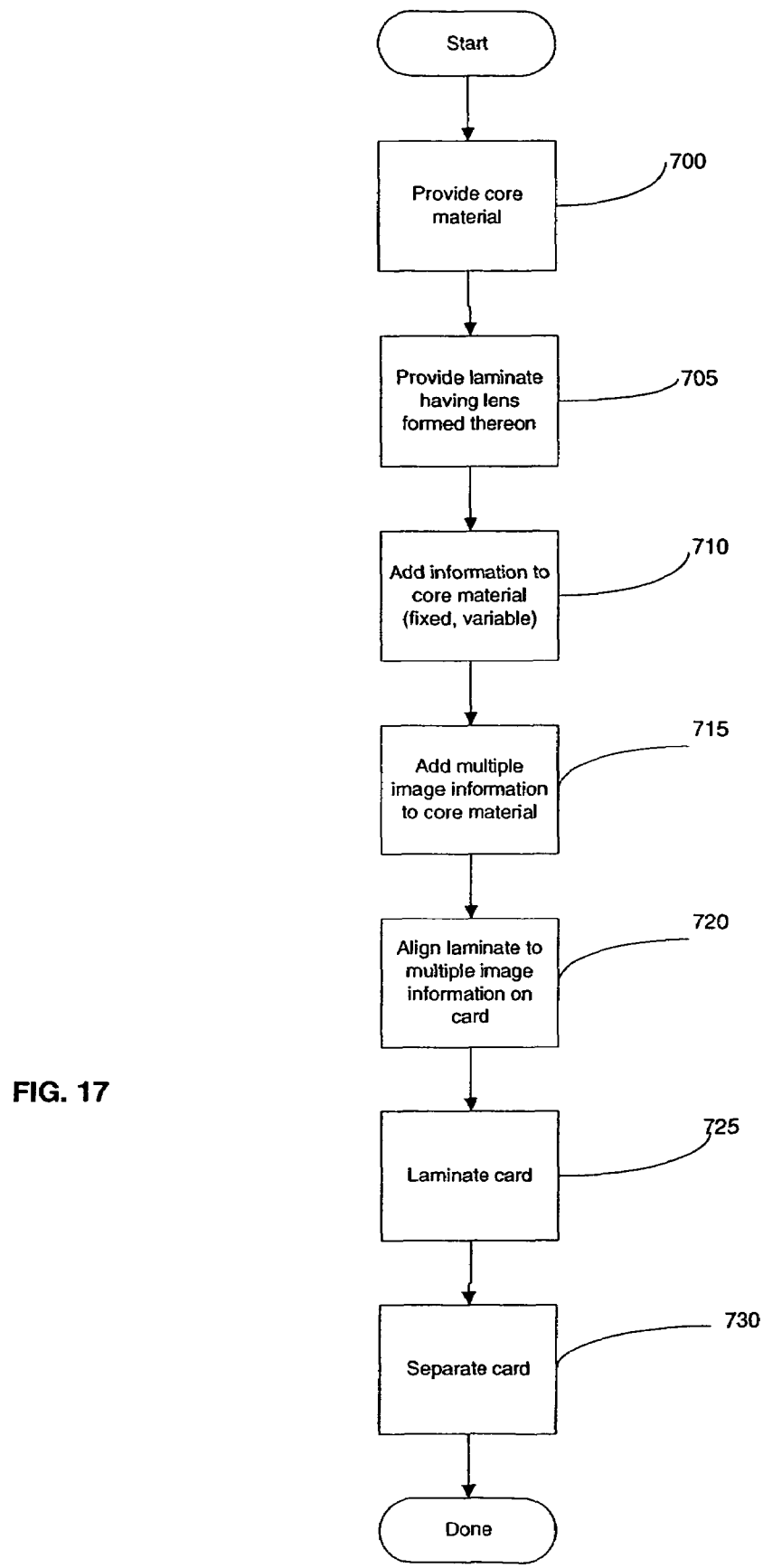
FIG. 17 is a flow chart of a second method for manufacturing the ID document of FIG. 3 in a central issue environment.
Figure 18:
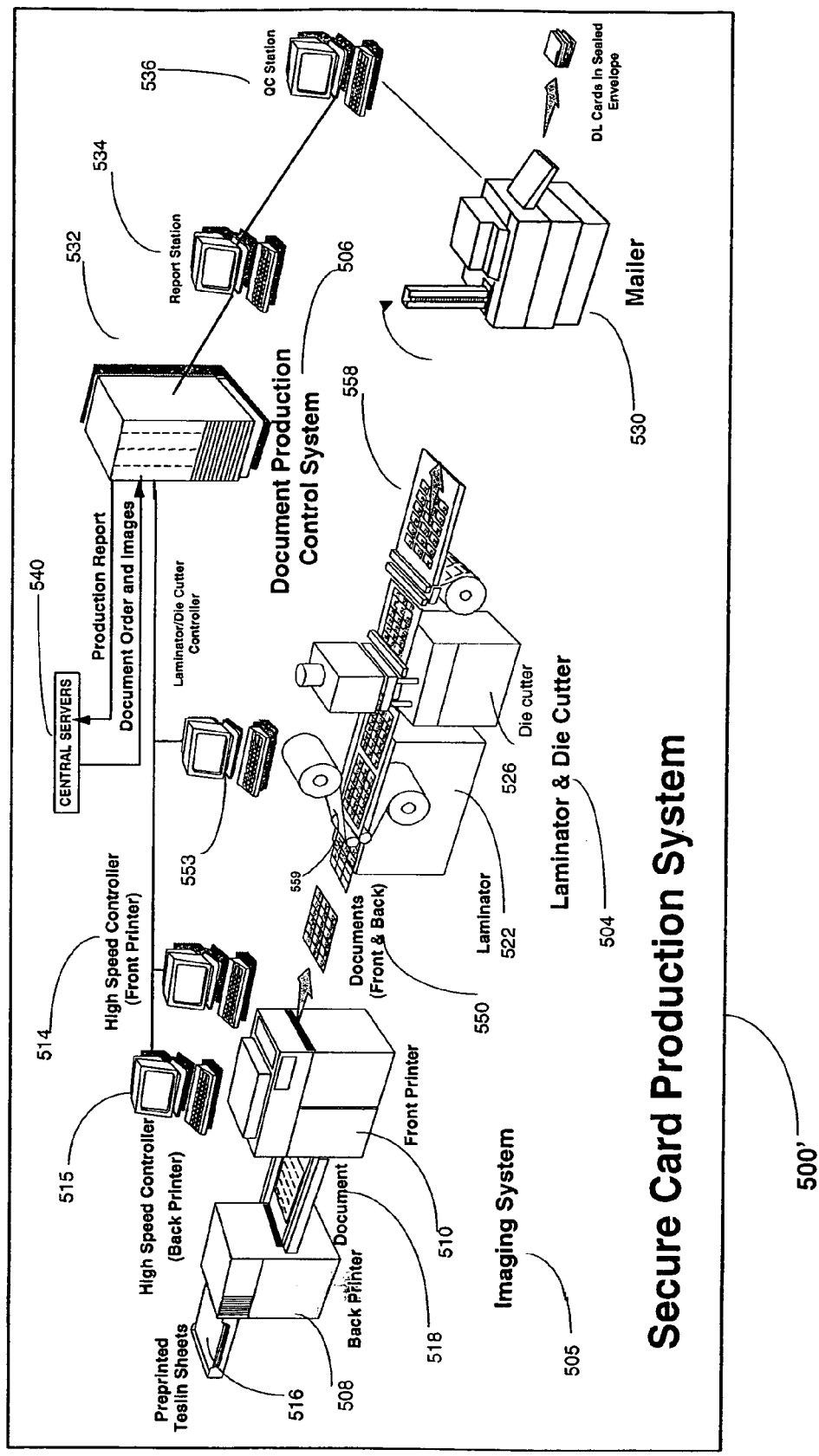
FIG. 18 is an illustrative diagram of a second central issue card production system that can be used to produce the ID document of FIG. 3, in accordance with one embodiment of the invention.
Figure 19:
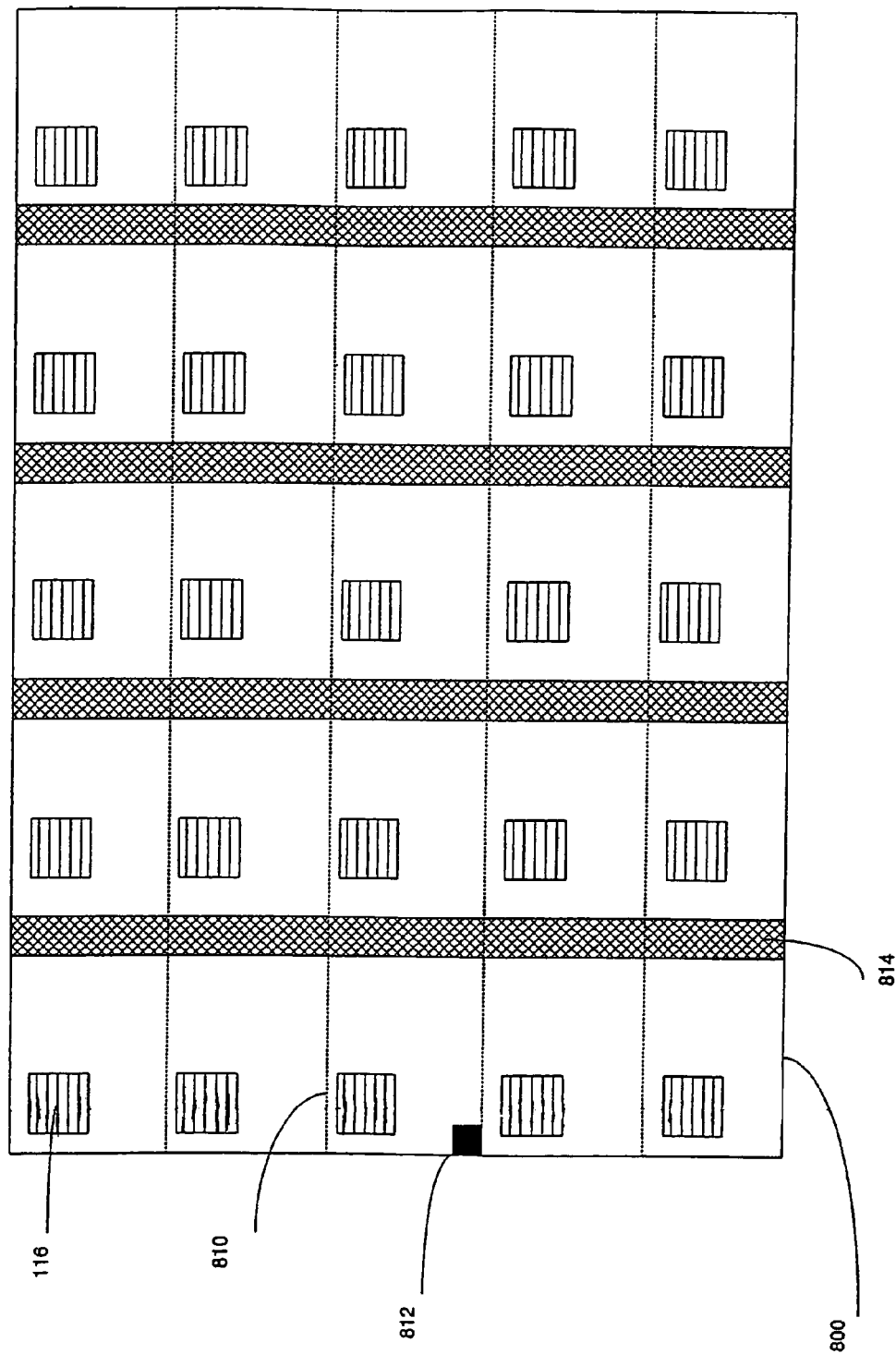
FIG. 19 is an illustration of a portion of a laminate roll showing a laminate with lenticular lenses embossed thereon.

For example, FIG. 17 is a flow chart of a method for manufacturing the ID document of FIG. 3 in a central issue environment where the creation of lenticules on the laminate 103 occurs prior to lamination, FIG. 18 is an illustrative diagram of a second central issue card production system 500' that can be used to produce the ID document of FIG. 3 in accordance with the method of FIG. 17, and FIG. 19 is an illustration of a portion of a laminate roll 800 showing laminate having lenticular lenses 116 formed thereon.

Referring to FIG. 17, laminate is provided (step 700). The laminate can be any laminate described previously that also is capable of being formed into lenticules. As will be readily understood by those in the art, the laminate can be provided in any usable form, such a s pellet, powder, hot melt, and the like. The laminate is extruded (step 703) in a manner known to those skilled in the art, and then the laminate is processed so that predetermined areas of the laminate have lenticular lens features (such as the lenticules 116 of FIGS. 3 and 4) formed thereon. In one embodiment, the processing of the laminate comprises using one or more known processes to form or emboss the lenticular shapes into predetermined areas of the laminate, prior to the laminate being laminated to the card. Such processes can, for example include embossing rollers, vacuum drums, vacuum forming dies, in line corrugators and shapers, cutters, punches, etc., all of which are described, e.g., on pages 354-360 of Sidney Levy and James F. Carley, Plastics Extrusion Technology Handbook (2nd ed., New York, 1989). Further, one or more methods detailed in the following U.S. patents also may be useable, in at least some embodiments of the invention, for forming the lenticules in the laminate: U.S. Pat. Nos. 2,815,310, 3,496,263, 4,765,656 and 5,560,799. The contents of these patents are incorporated by reference in their entirety. It also will be appreciated by those skilled in the art that prior to lamination to the card, certain laminates can have lenticules formed thereon by etching, engraving, milling, scratching, stamping, abrading, bending, filing, cutting, inscribing, and the like.

Referring again to FIG. 17, after the lens(es) are formed in the laminate, registration information is applied to the laminate (710), to ensure that the laminate is appropriately aligned to the information bearing document(s) to which it is attached. FIG. 19 is an illustration of a portion of a sheet of laminate roll 800 prior to step 715. In FIG. 19, it can be seen that a plurality of lenticular lenses 116 are formed in a registered fashion on the sheet of laminate 800. The sheet of laminate 800 in this example has been formed with divider lines 800 thereon, to further assist the later registration and lamination to the information bearing layer 106. The dotted lines 810 are provided for illustrative purposes only (these lines are not necessarily on the laminate) to show where the divisions between ID documents lie. A registration mark 812 is provided on one side of the laminate 800 also will assist when the laminate 800 is later coupled to the information bearing layer 106.

In at least one embodiment, the sheet of laminate 800 is part of a larger sheet of laminate that is eventually rolled (step 715) so that it can be used as the special laminate 559 of FIG. 18. Referring to FIGS. 17 and 18, when the documents 550 are fed to the laminator 522, the laminate is aligned so that each respective lenticular lens 116 is appropriately aligned to a corresponding multiple image feature on the information bearing layer 106 (step 720). The identification documents can then be laminated (step 725) and die cut (step 730) as described previously.

It should be understood that the lenticular multiple image information of at least some embodiments of the invention can be provided in any color, not only black. This is accomplished at least in part because the interlaced image is printed directly on the card and is produced using the original images. If the original images are in color then the interlaced image can have the same color replicated therein.

Identification Document with Three Dimensional Photo

In this section, we describe embodiments of an identification document with a three dimensional photo effect. The document creates this effect using a lens structure that optically combines two or more interleaved images of a subject (e.g., the document bearer's head) printed on a document layer below the lens.

Figure 20:
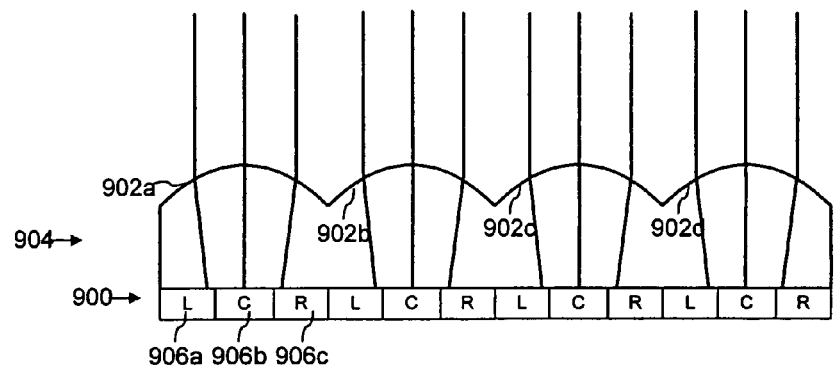
FIGS. 20-22 are diagrams illustrating a lens and image structure that create a three-dimensional effect for identification documents.
Figure 21:
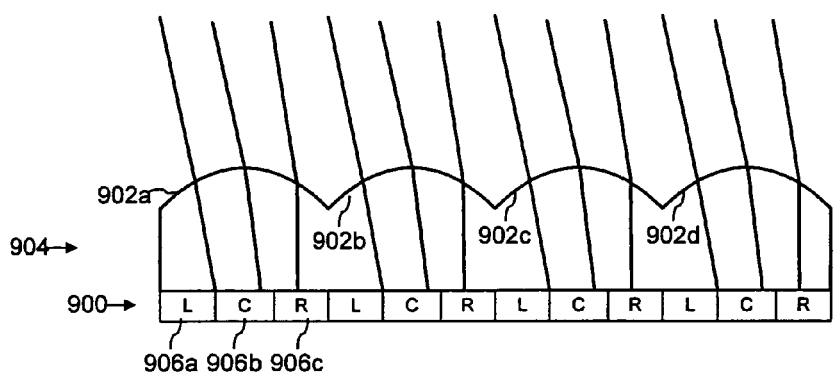
Figure 22:
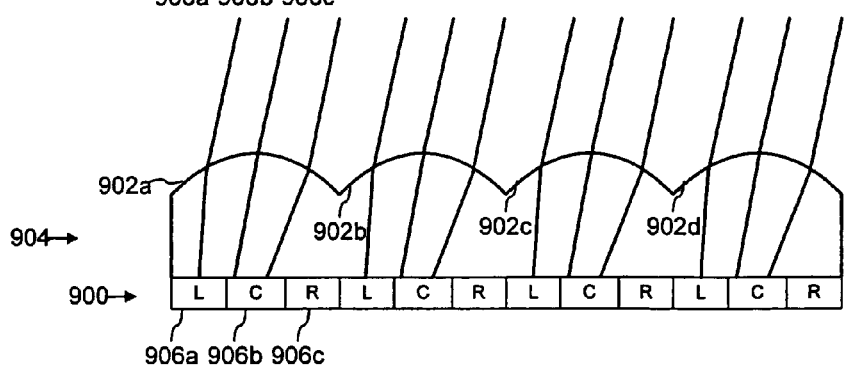

FIGS. 20-22 are diagrams illustrating a lens and image structure that create a three-dimensional effect for identification documents. In this example embodiment, the identification document enrollment system generates images portraying three perspectives of the bearer's head. These are referred to as L for Left, C for Center, and R for right. These left, right and center images are printed in an interleaved arrangement in image layer 900 and juxtaposed relative to lens elements 902*a-d* in a lens structure 904 so that when viewed through the lens structure, the viewer simultaneously sees portions of at least two perspectives of the head. The position and orientation of each lens element 902*a* correspond to a set of interleaved parts of the images 906*a-c* representing the different perspectives (L, C and R in this case). This simultaneous viewing of different perspectives creates the desired three-dimensional effect.

While the effect can be created to some extent with two or more images, we illustrate an example with three images of different perspectives of the subject.

In this example implementation, the images are interleaved along the vertical axis of the subject's head in each of the images. In particular, substantially parallel, linear strips of the L, C, and R images are aligned in a direction along the vertical axis of the photo, and the strips are interleaved in the horizontal direction. In this case of vertically interleaved strips, FIGS. 20-22 show a cross sectional view of the document layers along the vertical axis of the subject. In alternative implementations, the images can be captured from additional and/or different perspectives, such as top, center, bottom, and the interleaving may be performed along horizontal or other axes to create a desired three dimensional effect. In these alternative cases, the lens elements in the lens system are positioned so that each element projects a simultaneous view of a corresponding set of interleaved portions of at least two perspectives.

FIG. 20 shows an example of how the lens elements create a simultaneous view of different perspectives from a top view (perpendicular to the document surface). FIGS. 21 and 22 show how that view changes to show more of the left or right perspectives as the viewer looks at the document from left and right orientations, respectively.

In an identification document implementation, the lens structure is confined to the area corresponding to the subject's photo. Stated another way, the lens structure shown in FIG. 20 need only cover the area of the identification document corresponding to the printed interleaved images that create the three dimensional effect. The remainder of the document does not include the lens system.

The lens system can be an x/y system such that the lenses are sinusoidal in nature, or they can be individual lenses constructed in a variety of ways (e.g., glass beads, or embossed lenses within a plastic matrix). The focal point of the lens system and width of the interleaved image portions are selected to simultaneously image the interleaved portions as described previously. Additionally, the sizes of the lens elements are selected to correspond to the size of the interleaved image portions. For instance in our example, when each set of interleaved image strips are of equal width, the lens elements corresponding to them have substantially the same size.

One type of lens material suitable for this application is LENSTAR film available from Pacur/Eastman Chemical. This material is used to create an identification document laminate in which only predefined areas corresponding to the interleaved images of the bearer have the lens structure. In the process of making the identification document, registration marks on the laminate are used to register the lens structure to the printed images on document's core layer.

For added durability, the lenses are buried in the document structure. One approach to burying the lens structure in the document is to apply a coating of either a high refractive index material or a low n material on the lens structure prior to adding adhesive to the laminate, thereby creating a lenticular laminate with the lenses buried within the laminate. Conversely, one could apply glass beads to the inner surface to the laminate (prior to applying adhesive) to create the lens elements in the lens structure.

The effect created by this process and resulting document structure provides an anti-counterfeiting feature. Copies made of the feature only convey a two dimensional image, and thus, the feature presents a considerable barrier to counterfeiting attempts.

Figure 23:
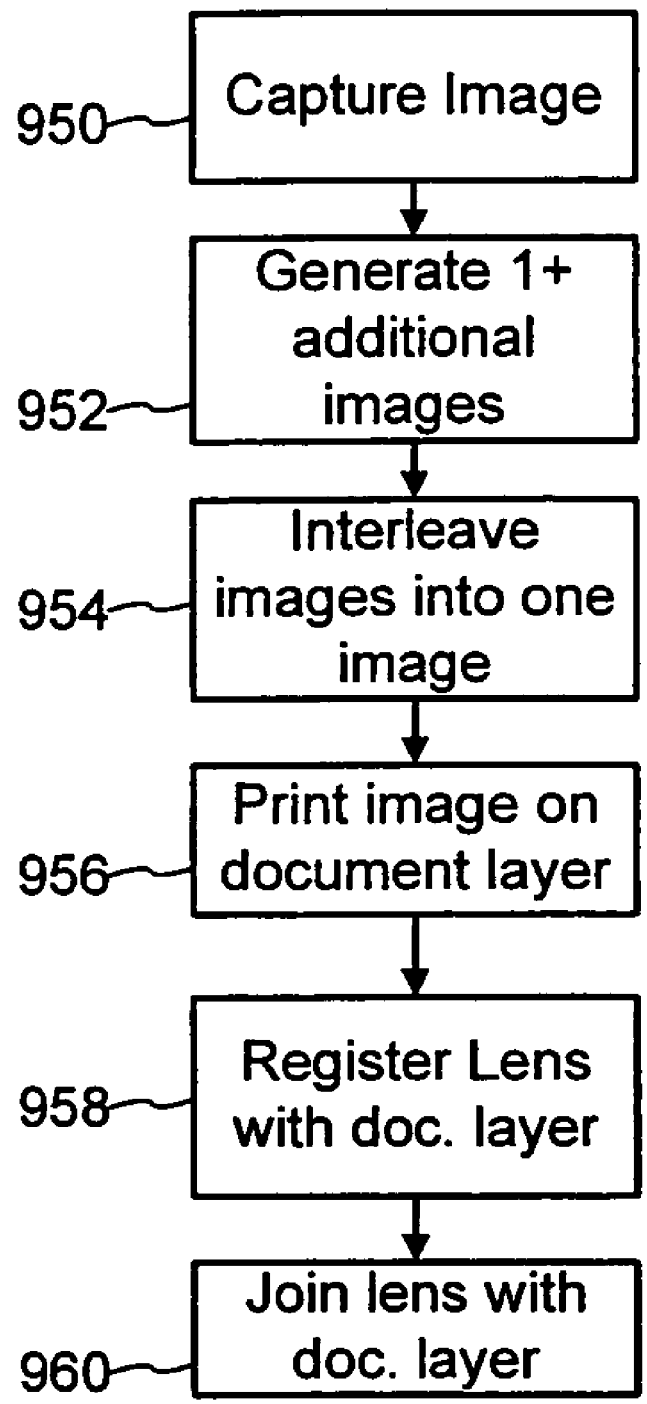
FIG. 23 is a flow diagram illustrating a method for creating the three-dimensional image effect on identification documents.

FIG. 23 is a flow diagram illustrating a process for creating the three-dimensional image effect on identification documents. The process starts by capturing an image of the subject, which in this case is the head/shoulders of the document bearer (950). Ultimately, the process generates one or more additional images of that subject from different perspectives as shown in block 952.

This part of the process may be performed in alternative ways. One way is to capture a single digital image using a conventional digital image capture station, extract a three dimensional model of the subject from the digital image, and then generate two or more two-dimensional images from desired perspectives from the three dimensional model. Software for generating the three dimensional model from the digital image is available from Cyberextruder.com, Inc. and is also described in International Patent Publication WO 02/095677, published Nov. 28, 2002, and in U.S. Published Patent Application No. U.S. 2004-0041804 A1, both of which are hereby incorporated by reference. Once the 3D model is created, 3D rendering software is used to convert the model into two dimensional images at the desired viewing perspectives.

Another way is to capture two or more digital images of the subject from different perspectives by placing image capture station(s) at locations (preferably equidistant) around the subject, and capturing an image at each of the locations, or using 3D camera equipment with optical systems for capturing images at the different perspectives. Analog film and optics systems may be used to capture images from the different perspectives, and the film may then be processed to create a composite image interleaving the images of the different perspectives.

Next, the process interleaves the images into one image following the guidelines described above, and prints the image on a substrate serving as a layer in the identification document, such as a core or laminate layer (954, 956). The interleaving process may be performed entirely through digital image processing in an image processing device, such as a programmed computer. In this case, the processor maps digital image pixels from each separate image into interleaved locations in a composite digital image, which is then printed. Alternatively, the interleaving is performed at least in part through controlling the printing of the separate images such that strips of each image are printed independently at particular corresponding spaced apart locations of the substrate in separate printing passes (e.g., e.g., each printing pass of the substrate through the printer prints a single image on the substrate, and this image is broken into individual pixels or groups of pixels that are spaced apart by blank spaces ultimately filled by one or more other images in the final composite printed image). This approach requires that the printer register the images in each pass so that the groups of pixels are interleaved properly. A related alternative is to print these portions on separate document layers, which are then joined together in registered fashion through lamination or some other process for joining layers of a document. For added tamper protection, these layers are joined using an adhesive that makes it exceedingly difficult to remove the photo without causing the individual groups of pixels on different layers to become separated.

The process then registers the lens structure layer with the image, which is printed on one or more document layers (958). As noted above, this can be achieved using registration markings on one or more of the respective document layers being joined together. For example, the location of the core carrying the printed image may be fixed in the laminator, and markings on a laminate carrying the lens structure are used to fix the location of the lens structure relative to the core. Next, the process joins the layer (e.g., a laminate layer) containing the lens structure to the core layer (960). Additional layers, such as printing, laminates, security structures (e.g., holograms, optical media, IC chips, RFID tags, etc.) can be added to the document to form a complete identification document.

While we specifically focused on creating a three dimensional effect of a photo of the bearer, a similar effect can be created by interleaving other image or graphical data on the document. The photo of the bearer provides advantages because it constitutes variable data that varies from one document to the next, making it more difficult to forge and reproduce in a systematic way for counterfeit identification documents. In addition, it provides another dimension to the human verification process, where a person focuses his or her attention on the photo to ensure that it matches the bearer, that it looks un-tampered, and that it has the readily recognizable 3D effect.

CONCLUDING REMARKS

Having described and illustrated the principles of the technology with reference to specific implementations, it will be recognized that the technology can be implemented in many other, different, forms, and in many different environments.

For example, while the creation of an apparent 3D image has been emphasized in certain of the foregoing discussion (and in the title), it will be recognized that the specification and claims detail a variety of novel arrangements in which this feature is not essential.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that various printing processes can be used to create the identification documents described in this document. It will be appreciated by those of ordinary skill in the art that several print technologies including but not limited to indigo (variable offset) laser xerography (variable printing), offset printing (fixed printing), inkjet (variable printing), dye infusion, mass-transfer, wax transfer, variable dot transfer can be used to print variable and/or fixed information one or more layers of the document. The information can be printed using dots, lines or other structures of varying colors to form text or images. The information also can comprise process colors, spot or pantone colors.

It should be appreciated that the methods described above or in the incorporated documents with respect to processing data stored in machine readable devices in the document can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software embodying these software methods, functions or routines can be stored on a computer readable media, such as a diskette, removable media, DVD, CD, hard drive, electronic memory circuit, etc.).

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. In a method of producing an identification document that includes:
    capturing an image of a person; and
    printing image data so that the image data is conveyed by the document, wherein the image data corresponds to the captured image;
    an improvement comprising:
    producing a 3D representation from a single captured 2D image;
    from said 3D representation, generating at least two 2D images; and
    printing, in interleaved fashion, image data from said generated 2D images so that the image data is conveyed by the identification document.

2. The method of claim 1 that includes constructing said identification document of laminated layers, wherein said printing and said constructing are arranged so that delamination of the document causes evidence of tampering to appear in said printed image data.

3. The method of claim 1 in which said printing includes printing data from a first of said generated images on a first layer, and printing data from a second of said generated images on a second layer, and in which the method includes laminating said printed layers.

4. The method of claim 1 that includes forming a lenticular lens array with the document, wherein first and second of said generated 2D images yield a 3D impression when viewed by a human viewer through said lens array.

5. The method of claim 1 that includes forming a lenticular lens array with the document, said forming including embossing a laminate layer.

6. The method of claim 1 that includes forming a lenticular lens array with the document, said forming including burying beads in a laminate construction.

7. The method of claim 1 that includes forming a lenticular lens array with the document, said forming including shaping a surface of a laminate layer, and coating said surface with a material having a different refractive index prior to applying adhesive to said laminate layer.

8. In a method of producing an identification document that includes:
- capturing an image of a person; and
- printing image data so that the image data is conveyed by the document, the image data corresponding to the captured image;

an improvement comprising:
- positioning the person within view of first and second spaced-apart locations;
- capturing first and second images of the person from perspectives of the first and second locations; and
- printing, in interleaved fashion, image data from said first and second images so that the image data is conveyed by the identification document.

9. The method of claim 8 that includes constructing the identification document of laminated layers, wherein said printing and said constructing are arranged so that delamination of the document causes evidence of tampering to appear in the printed image data.

10. The method of claim 8 in which said printing includes printing data from the first image on a first layer, and printing data from the second image on a second layer, and in which the method includes laminating the printed layers.

11. The method of claim 8 that includes forming a lenticular lens array with the document, wherein the first and second images yield a 3D impression when viewed by a human viewer through the lens array.

12. The method of claim 8 that includes forming a lenticular lens array with the document, said forming including embossing a laminate layer.

13. The method of claim 8 that includes forming a lenticular lens array with the document, said forming including burying beads in a laminate construction.

14. The method of claim 8 that includes forming a lenticular lens array with the document, said forming including shaping a surface of a laminate layer, and coating said surface with a material having a different refractive index prior to applying adhesive to said laminate layer.

* * * * *

UNITED STATES PATENT AND TRADEMARK OFFICE
CERTIFICATE OF CORRECTION

| | | |
|---|---|---|
| PATENT NO. | : 7,712,673 B2 | Page 1 of 1 |
| APPLICATION NO. | : 10/954966 | |
| DATED | : May 11, 2010 | |
| INVENTOR(S) | : Jones | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 751 days.

Signed and Sealed this
Eleventh Day of January, 2011

David J. Kappos
*Director of the United States Patent and Trademark Office*